United States Patent
Verma

(10) Patent No.: US 7,801,885 B1
(45) Date of Patent: Sep. 21, 2010

(54) SEARCH ENGINE SYSTEM AND METHOD WITH USER FEEDBACK ON SEARCH RESULTS

(76) Inventor: Neal Akash Verma, 1200 Blalock #210, Houston, TX (US) 77055

( * ) Notice: Subject to any disclaimer, the term of this patent is extended or adjusted under 35 U.S.C. 154(b) by 372 days.

(21) Appl. No.: 12/020,461

(22) Filed: Jan. 25, 2008

Related U.S. Application Data

(60) Provisional application No. 60/886,565, filed on Jan. 25, 2007, provisional application No. 60/938,002, filed on May 15, 2007.

(51) Int. Cl.
*G06F 17/30* (2006.01)

(52) U.S. Cl. .................. 707/713; 707/758; 707/759

(58) Field of Classification Search ............ 707/713, 707/758, 759
See application file for complete search history.

(56) References Cited

U.S. PATENT DOCUMENTS

| | | | |
|---|---|---|---|
| 5,870,740 A * | 2/1999 | Rose et al. ............... 707/759 |
| 6,516,337 B1 * | 2/2003 | Tripp et al. ............... 709/202 |
| 6,947,924 B2 * | 9/2005 | Bates et al. ............... 707/708 |
| 7,062,483 B2 * | 6/2006 | Ferrari et al. ............. 707/706 |
| 7,072,888 B1 * | 7/2006 | Perkins .................... 707/733 |
| 7,113,917 B2 | 9/2006 | Jacobi et al. | |
| 7,181,438 B1 * | 2/2007 | Szabo ....................... 707/706 |
| 7,200,592 B2 * | 4/2007 | Goodwin et al. ........... 706/46 |
| 7,565,630 B1 * | 7/2009 | Kamvar et al. ........... 715/744 |
| 2002/0069190 A1 | 6/2002 | Geiselhart | |
| 2006/0143160 A1 | 6/2006 | Vayssiere | |
| 2006/0271524 A1 | 11/2006 | Tanne et al. | |
| 2007/0038659 A1 | 2/2007 | Datar et al. | |
| 2007/0106659 A1 | 5/2007 | Lu et al. | |
| 2007/0124283 A1 | 5/2007 | Gotts et al. | |
| 2007/0266022 A1 | 11/2007 | Frumkin et al. | |
| 2007/0276807 A1 * | 11/2007 | Chen et al. ............... 707/758 |

* cited by examiner

*Primary Examiner*—Shahid A Alam
(74) *Attorney, Agent, or Firm*—Charles L. Hamilton; Fountainhead Law Group PC

(57) ABSTRACT

In one embodiment the present invention includes a search engine that incorporates user feedback to refine search results. The feedback of users regarding previous search results is used to increase the relevancy of future searches. Feedback responses by a particular user may be tracked for user loyalty purposes, in order to increase the amount of user feedback.

55 Claims, 20 Drawing Sheets

822

Enter search query     Links    Username    Total Points: 74

My Account

824

Rewards Center
[] Rewards catalog
[] Wish list
[] Shopping cart
[] My recommended sites

826

Personal Information
[] Shipping information
[] Email address
[] Password
[] Referrals
[] Logout

| | | Links | Username | Total Points: 74 |

Catalog

| Picture | Item name and description Point cost | ☐ QTY | | Subtotal |
| Picture | Item name and description Point cost | ☐ QTY | | Subtotal |
| Picture | Item name and description Point cost | ☐ QTY | | Subtotal |
| Picture | Item name and description Point cost | ☐ QTY | | Subtotal |
| Picture | Item name and description Point cost | ☐ QTY | | Subtotal |
| Picture | Item name and description Point cost | ☐ QTY | | Subtotal |

Total

```
function fnShowSite(obj)
{
    clearTimeout(timerID);
    var frmobj;
    var divobj;
    var thename = "frameWindow1";

if (document.getElementById("hdnLoad").value == "true")
    {
        document.getElementById("hdnLoad").value = "false";
        document.getElementById("hdnUnload").value = "false";
        frmobj=document.getElementById? document.getElementById(thename):document.all.thename;

if (BrowserDetect.browser == "Firefox")
        {
            frmobj=document.getElementById? document.getElementById(thename):document.all.thename;
            divobj = document.getElementById? document.getElementById('divFrame'):document.all.thename;
            frmobj.style.display = "inline";
            divobj.style.display = "inline";
            frmobj.src = obj;
        }
        else if (BrowserDetect.browser == "Explorer")
        {
            frmobj=document.getElementById? document.getElementById(thename):document.all.thename;
            divobj = document.getElementById? document.getElementById('divFrame'):document.all.thename;
            frmobj.style.display = "inline";
            divobj.style.display = "inline";
            frmobj.src = obj;

if (BrowserDetect.version = 6)
            {
                if (divHeight == 0)
                {
                    divHeight = divobj.offsetHeight;
                }
                frmobj.style.width = divobj.offsetWidth;
                frmobj.style.height = divHeight - 30;
            }
        }
        else
```

(to 12B)

FIG. 12A (from 12A)

```
{
    if(iens6 || iens6 != null)
    {
        frmobj=document.getElementById?
document.getElementById(thename):document.all.thename;
        frmobj.style.position = "absolute";
        frmobj.style.height = "80%";
        frmobj.style.width = "80%";
        frmobj.src = obj;
        var pos = getAbsolutePosition(obj);
        frmobj.style.top = pos.y - 50;
        frmobj.style.left = pos.x + 130;
        frmobj.style.display = "inline";
    }
    if(ns4)
    {
        frmobj = eval("document."+thename)
        frmobj.height = screen.availHeight - 200;
        frmobj.width = screen.availWidth - 300;
        frmobj.src = obj;
        var pos = getAbsolutePosition(obj);
        frmobj.style.pixelTop = pos.y;
        frmobj.style.pixelLeft = pos.x + 130;
        frmobj.style.display = "inline";
    }
    else
    {
        frmobj=document.getElementById?
document.getElementById(thename):document.all.thename;
        frmobj.style.position = "absolute";
        frmobj.style.height = "80%";
        frmobj.style.width = "80%";
        frmobj.src = obj;
        var pos = getAbsolutePosition(obj);

if (pos.y < 350)
        {
            frmobj.style.top = pos.y - 50;
        }
        else
        {
            frmobj.style.top = pos.y - 450;
        }
            frmobj.style.left = pos.x + 130;
            frmobj.style.display = "inline";
    }
  }
 }
 else
```

(from 12B)

```
            {
              if(iens6)
              {
                      frmobj=document.getElementById?
document.getElementById(thename):document.all.thename;
              }
           if(ns4)
           {
                   frmobj = eval("document."+thename);
           }
           frmobj.src = obj;
             }
     } function fnHideSite()
     { try
         {
            if (document.getElementById("hdnUnload").value == "true")
            {
                document.getElementById("hdnLoad").value = "true";
                document.getElementById("hdnUnload").value = "false";
                var frmobj = document.getElementById("frameWindow1");
                   frmobj.style.display = "none";

var divobj = document.getElementById("divFrame");
                   divobj.style.display = "none";

}
         }
         catch(e)
         {
             alert(e.Message);
         }
     } function timer(sec)
{
   seconds=parseInt(sec)
   if(seconds>0)
   {
     seconds--
     timerID=setTimeout("timer(seconds)",250);
   }
   else
   {
      if (document.getElementById("hdnInsideFrame").value=="false")
      {
           document.getElementById("hdnUnload").value = "true";
           fnHideSite();
      }
   }
}
```

FIG. 12C

```
CREATE TABLE [iRazoo].[BasketDetail](
        [BASKET_ITEMS_ID] [int] IDENTITY(1,1) NOT NULL,
        [BASKET_ID] [int] NOT NULL,
        [PRODUCT_ID] [int] NOT NULL,
        [PRODUCT_QTY] [int] NOT NULL,
        [SALE_POINTS] [int] NOT NULL,
        [ADJUSTED_POINTS] [int] NULL, CREATE TABLE [iRazoo].[iRazoo_User](
        [User_ID] [int] IDENTITY(1,1) NOT NULL,
        [Username] [varchar](25) NOT NULL,
        [Name_Title] [varchar](5) NULL,
        [Name_First] [varchar](100) NULL,
        [Name_Middle] [varchar](1) NULL,
        [Name_Last] [varchar](100) NULL,
        [Name_Suffix] [varchar](50) NULL,
        [User_Password] [varchar](max) NULL,
        [Referred_From] [varchar](100) NULL,
        [Email_Id] [varchar](100) NULL,
        [Last_LoggedIn] [smalldatetime] NULL,
        [Reg_Date] [smalldatetime] NULL,
        [Phone] [varchar](12) NULL,
        [Active] [char](1) NULL DEFAULT ('N'),
        [ReferralCount] [int] NULL CONSTRAINT [DF_iRazoo_User_ReferralCount] DEFAULT ((0)),
        [HasEmailAccount] [char](1) NULL CONSTRAINT [DF_iRazoo_User_HasEmailAccount] DEFAULT (NULL),
        [BigStringPassword] [varchar](50) NULL, CREATE TABLE [iRazoo].[Video_User_Comments](
        [Id] [bigint] IDENTITY(1,1) NOT NULL,
        [UserRecId] [bigint] NOT NULL,
        [Username] [varchar](25) NULL,
        [Ipaddress] [varchar](25) NULL,
        [Comment] [varchar](250) NULL,
        [CreateDate] [datetime] NULL CONSTRAINT [DF_Video_User_Comments_CreateDate] DEFAULT (getdate()),
```

FIG. 13A

```
CREATE TABLE [iRazoo].[tellafriend_log](
        [log_id] [int] IDENTITY(1,1) NOT NULL,
        [sending_date] [datetime] NULL,
        [from_email] [varchar](50) NULL,
        [from_name] [varchar](50) NULL,
        [to_email] [varchar](50) NULL,
        [to_name] [varchar](50) NULL,
        [Username] [varchar](50) NULL,
        [message_comments] [text] NULL CREATE TABLE [iRazoo].[Video_User_Search_Mapping](
        [Id] [bigint] IDENTITY(1,1) NOT NULL,
        [Username] [varchar](25) NOT NULL,
        [UserRecId] [bigint] NOT NULL,
        [Ipaddress] [varchar](25) NULL,
        [Keywords] [varchar](200) NULL,
        [Value] [varchar](5) NULL CONSTRAINT [DF_Video_User_Search_Mapping_Value] DEFAULT ((1)),
        [CreateDate] [datetime] NULL CONSTRAINT [DF_Video_User_Search_Mapping_CreateDate] DEFAULT
(getdate()),
        [Comment] [varchar](250) NULL, CREATE TABLE [iRazoo].[IPlocation](
        [IPFROM] [numeric](18, 0) NOT NULL,
        [IPTO] [numeric](18, 0) NULL,
        [COUNTRY_SHORT] [varchar](50) NULL,
        [COUNTRY_LONG] [varchar](100) NULL
```

FIG. 13B

```
CREATE TABLE [iRazoo].[UserRecommended_Search](
        [Id] [bigint] IDENTITY(1,1) NOT NULL,
        [URL] [varchar](200) NULL,
        [Description] [varchar](1000) NULL,
        [Value] [int] NULL CONSTRAINT [DF_UserRecommended_Search_Value] DEFAULT ((1)),
        [CreateDate] [smalldatetime] NULL CONSTRAINT [DF_UserRecommended_Search_CreateDate] DEFAULT
(getdate()),
        [HasComments] [char](1) NULL CONSTRAINT [DF_UserRecommended_Search_HasComments] DEFAULT
('N'), CREATE TABLE [iRazoo].[User_Search_Mapping](
        [Id] [bigint] IDENTITY(1,1) NOT NULL,
        [Username] [varchar](25) NOT NULL,
        [UserRecId] [bigint] NOT NULL,
        [Ipaddress] [varchar](25) NULL,
        [Keywords] [varchar](200) NULL,
        [Value] [varchar](5) NULL CONSTRAINT [DF_User_Search_Mapping_Value] DEFAULT ((1)),
        [CreateDate] [datetime] NULL CONSTRAINT [DF_User_Search_Mapping_CreateDate] DEFAULT (getdate()),
        [Comment] [varchar](250) NULL, CREATE TABLE [iRazoo].[User_Comments](
        [Id] [bigint] IDENTITY(1,1) NOT NULL,
        [UserRecId] [bigint] NOT NULL,
        [Username] [varchar](25) NULL,
        [Ipaddress] [varchar](25) NULL,
        [Comment] [varchar](250) NULL,
        [CreateDate] [datetime] NULL CONSTRAINT [DF_User_Comments_CreateDate] DEFAULT (getdate()), CREATE TABLE [iRazoo].[News_User_Comments](
        [Id] [bigint] IDENTITY(1,1) NOT NULL,
        [UserRecId] [bigint] NOT NULL,
        [Username] [varchar](25) NULL,
        [Ipaddress] [varchar](25) NULL,
        [Comment] [varchar](250) NULL,
        [CreateDate] [datetime] NULL CONSTRAINT [DF_News_User_Comments_CreateDate] DEFAULT (getdate()), CREATE TABLE [iRazoo].[News_User_Search_Mapping](
        [Id] [bigint] IDENTITY(1,1) NOT NULL,
        [Username] [varchar](25) NOT NULL,
        [UserRecId] [bigint] NOT NULL,
        [Ipaddress] [varchar](25) NULL,
        [Keywords] [varchar](200) NULL,
        [Value] [varchar](5) NULL CONSTRAINT [DF_News_User_Search_Mapping_Value] DEFAULT ((1)),
        [CreateDate] [datetime] NULL CONSTRAINT [DF_News_User_Search_Mapping_CreateDate] DEFAULT
(getdate()),
        [Comment] [varchar](250) NULL,
```

FIG. 13C

```
CREATE TABLE [iRazoo].[News_UserRecommended_Search](
        [Id] [bigint] IDENTITY(1,1) NOT NULL,
        [URL] [varchar](200) NULL,
        [Description] [varchar](1000) NULL,
        [Value] [int] NULL CONSTRAINT [DF_News_UserRecommended_Search_Value] DEFAULT ((1)),
        [CreateDate] [datetime] NULL CONSTRAINT [DF_News_UserRecommended_Search_CreateDate] DEFAULT
(getdate()),
        [HasComments] [char](1) NULL CONSTRAINT [DF_News_UserRecommended_Search_HasComments]
DEFAULT ('N'), CREATE TABLE [iRazoo].[Product](
        [PRODUCT_ID] [int] IDENTITY(1,1) NOT NULL,
        [PRODUCT_NAME] [varchar](100) NULL,
        [PRODUCT_DESC] [varchar](250) NULL,
        [PRODUCT_SPEC] [varchar](max) NULL,
        [PRODUCT_IMAGE] [varchar](50) NULL,
        [POINTS_WORTH] [int] NOT NULL,
        [PRODUCT_AVAIL] [int] NOT NULL,
```

FIG. 13D

```
CREATE TABLE [iRazoo].[Basket](
    [BASKET_ID] [int] IDENTITY(1,1) NOT NULL,
    [User_ID] [int] NOT NULL,
    [BASKET_TYPE] [bit] NOT NULL,
    [ORDER_COMPLETE] [char](1) NOT NULL,
    [DATE_CREATED] [datetime] NULL,
    [DATE_MODIFIED] [datetime] NULL, CREATE TABLE [iRazoo].[Points](
    [POINTS_ID] [int] IDENTITY(1,1) NOT NULL,
    [USER_ID] [int] NULL,
    [POINTS_EARNED] [int] NULL,
    [TODAY_POINTS] [int] NULL,
    [TODAY_DATE] [smalldatetime] NOT NULL, CREATE TABLE [iRazoo].[Address](
    [Address_ID] [int] IDENTITY(1,1) NOT NULL,
    [User_ID] [int] NOT NULL,
    [Address_1] [varchar](100) NULL,
    [Address_2] [varchar](100) NULL,
    [Address_Type] [varchar](20) NULL,
    [Zipcode_int] [int] NULL,
    [Zip] [char](5) NULL,
    [City] [char](20) NULL,
    [State] [varchar](50) NULL,
    [Country] [char](50) NULL,
```

FIG. 13E

SEARCH ENGINE SYSTEM AND METHOD WITH USER FEEDBACK ON SEARCH RESULTS

CROSS REFERENCE TO RELATED APPLICATIONS

The present application claims priority to U.S. Provisional Application No. 60/886,565 titled "Internet Search Engine or Meta-Search Engine Software Program (Computer Software Implemented Method and Apparatus) that Produces User Recommended Results", filed Jan. 25, 2007; and U.S. Provisional Application No. 60/938,002 titled "User Driven Search Engine Software with Loyalty Rewards", filed May 15, 2007; both of which are incorporated herein by reference.

BACKGROUND

The present invention relates to internet search engines, and in particular, to internet search engines that use feedback to refine search results.

Unless otherwise indicated herein, the approaches described in this section are not prior art to the claims in this application and are not admitted to be prior art by inclusion in this section.

Currently, most software search engines use a method whereby a user enters in search query keywords into a computer. This search query is transmitted from the user's computer to the search engine's sever. On the search engine's server, a search engine's database resides. The user's search query is compared to the keywords in the search engine database. Any website URLs (uniform resource locators, or addresses) that are associated with these keywords are then transmitted from the search engine's database to the user's computer.

A current search engine's database of websites is updated via an automated program referred to as a "crawler" or "spider". The crawler records the data and text on many websites on the internet and indexes (copies and stores) this information into the search engine's database. One problem with this approach is that after all the text on an entire web page has been recorded and inserted into the database, a user's keyword query can still produce an enormous amount of results. Many websites can be indexed under a keyword even if that particular keyword only shows up once on that website's entire web page. Therefore the user is faced with the task of going through all the resultant website addresses that are produced from his search query to find the one result that satisfies his informational hunt. Most search engines can have millions of results to a single keyword query. One problem with this type of search software is that the indexing of the websites is done solely by a software algorithm based on a strict set of criteria such as keyword popularity on a particular webpage.

Other enhanced search engines rank their search results based on the popularity of user based clicks on a particular search result uniform resource locator (URL). The search result URLs that have the most click-throughs from human users who have clicked that particular result are ranked first, and those websites that have the second number of click-throughs are ranked second, etc. One problem with this type of popularity ranking (based on URL click-throughs) is that users often are not showing their preference for a site based on their click-through to it, but rather are just clicking the search result URL that appears based on factors such as the rank on the page or the name of the website. Just because many users have clicked on a particular search result URL does not mean that website is actually meeting their particular informational needs. That user in fact has no idea as to the content of that particular web page and has to actually click through to see the content of the website, read it, and then determine whether that particular website has met that user's need.

Thus, there is a need for improved search engines. The present invention solves these and other problems by providing a search engine that includes user feedback.

SUMMARY

Embodiments of the present invention improve search engines using feedback from users. In one embodiment the present invention includes computer-implemented method of using user feedback to improve searching. The method includes receiving a query from a user, generating a first plurality of search results from a first search database using the query, and generating a second plurality of search results from a second search database using the query. The first search database includes a first plurality of search data and a plurality of user feedback data associated with the first plurality of search data. The second search database includes a second plurality of search data. The method further includes displaying the first plurality of search results according to the plurality of user feedback data that corresponds to the first plurality of search results, and displaying the second plurality of search results. The method further includes displaying a feedback request regarding a particular search result of the first plurality of search results and the second plurality of search results. The method further includes receiving feedback from the user in response to the feedback request. The method further includes updating the first plurality of search data and the plurality of user feedback data in the first search database according to the query, the particular search result, and the feedback.

In general, embodiments of the present invention include software programs, including without limitation computer software implemented methods and apparatus, that produce user recommended results in combination with a rewards system.

Embodiments of the present invention relate to a method and apparatus that allows for an enhanced internet search engine that produces user recommended results and rewards users for using the internet search engine.

According to one embodiment of the present invention, a user goes to an internet search engine and uses it to perform a search query. The search engine produces its search results on a search result web page. The user then clicks on a search result. The resulting website that comes out of the click is opened up on another web page. That web page has a header of the original search engine with the resulting webpage beneath it. The header has wording such as "Do you recommend this site, yes or no." If user clicks yes, that website URL is placed into a database and is cross-indexed to the search query the user entered. After the URL and query have been recorded by the database, then the next time a user goes to the search engine and types in the same query, a "user recommended" heading shows on the results page with the indexed URL (that was previously recommended) shown below. These "user recommended" results may be intermixed with, or segregated from, the regular search results that are returned by the internet search engine.

In one embodiment of the present invention, a database of search results are refined with users' opinions. Users may "recommend" or "not recommend" a website address by clicking on icons that state "recommend" or "not recommend". By explicitly stating whether they recommend or don't recommend a website, users are able to update the search engine database. The database may store in a separate place the website URL that users have explicitly identified as "recommended" or "not recommended". This process eventually leads to the creation of a second set of search results that may be shown on the search result page under the heading of "user recommended sites" along with the regular search engine listings. These user-recommended web sites may give better search results than other enhanced search engines.

In one embodiment of the present invention, users click through to the URL on the search engine results page, and are asked at the top whether they recommend or don't recommend this site to others. The resulting data that is gathered from users then creates a second database based on user opinions. If the user believes that this particular website answered his/her particular question, then one can expect that other users with a similar query will also get their questions answered by visiting that particular site which the previous user had marked as "recommended".

In one embodiment of the present invention, users can be also motivated or encouraged to help recommend sites to the database by incentivizing them to click on the "recommend" or "not recommend" buttons by way of points, similar to the way credit cards incentivize travelers with airline miles. These points can then be accumulated by the user each time they recommend (or don't recommend) a site, and then these points can be converted into rewards located on the search engine's website.

The following detailed description and accompanying drawings provide a better understanding of the nature and advantages of the present invention.

BRIEF DESCRIPTION OF THE DRAWINGS

FIG. 9 shows an example of a "My account" HTML webpage from a user feedback search engine with points according to an embodiment of the present invention.

FIG. 10 shows an example of a catalog webpage from a user feedback search engine with points according to an embodiment of the present invention.

FIGS. 12A-12C are computer program code listings that provide a more detailed example of the JAVASCRIPT™ functions that may be used to implement embodiments of the present invention.

FIGS. 13A-13E show example data tables according to an embodiment of the present invention.

DETAILED DESCRIPTION

Described herein are techniques for improving the results of search engines. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the below description, the term "search engine" is used. It is to be understood that this term generally refers to a computer program that returns results in response to a user query. The results may include links to web pages. In addition, the search engine may include a "crawler" component that obtains information from the internet by "crawling" the web, as well as an "indexer" component that indexes the information obtained by the crawler. The term "search engine" is also intended to include meta-search engines, real-time search engines, index based search engines, open directory style search engines, directory listing websites, yellow page style websites, and indices.

Figure 1:
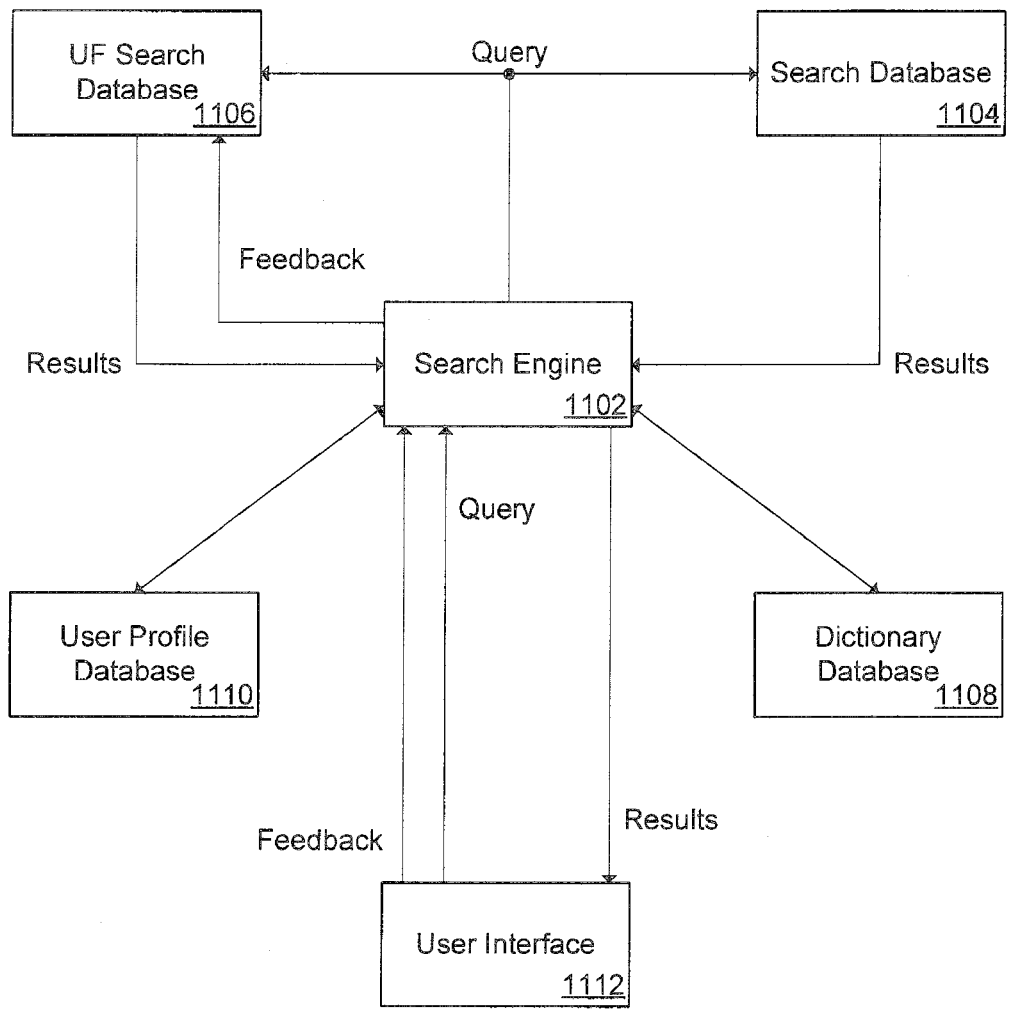
FIG. 1 is a block diagram of a search engine system according to an embodiment of the present invention.

FIG. 1 is a block diagram of a search engine system 1100 according to an embodiment of the present invention. The search engine system 1100 includes a search engine 1102, a search database 1104, a user feedback search database 1106, a dictionary database 1108, a user profile database 1110, and a user interface 1112.

The search engine 1102 receives a query from the user, performs searching of the search database 1104 and the user feedback search database 1106, and generates search results. The search engine 1102 may also include a crawler component and an indexer component for gathering data from the internet (not shown) to populate the search database 1104.

The search database 1104 contains search data. The search data may be information gathered from the internet. The search data may include indexed information and URLs for the websites that correspond to the indexed information. The query is used to access the indexed information to produce the URLs of the websites related to the query.

The user feedback search database 1106 contains user feedback search data. The user feedback search data may include indexed information, URLs that correspond to the indexed information, and user feedback data related to the URLs. According to one embodiment, the feedback from users is recommendations, and the user feedback data relates to whether a particular URL is "recommended". The query is used to access the indexed information to produce the URLs of the websites related to the query.

The dictionary database 1108 contains dictionary data. The search engine 1102 may use the dictionary data to revise the query when searching the user feedback search database 1106. The search engine 1102 may also use the dictionary data when incorporating the user's feedback into the user feedback search database 1106.

More specifically, the dictionary database 1108 may include words (search terms) and their associated classification according to type of speech. The classifications may include that the term is a noun, verb, adjective, etc. The search engine 1102 may use the dictionary database 1108 to revise a query according to the classification of the terms in the query. The search engine 1102 may also use the dictionary database 1108 when updating the information stored in the user feedback search database 1106. The dictionary database 1108 is more fully described in subsequent sections.

The user profile database 1110 contains information about a user of the search engine. This information may include the user's login information, the user's personal information such as address, the user's account information such as the number of points accrued (see below for a more detailed discussion of rewards), and the user's feedback information (for example, that the user has recommended a particular website). More details regarding the user profile database 1110 and the information it may contain are provided in subsequent sections.

The user interface 1112 interfaces between the user and the search engine 1102. The user interface 1112 may include a graphical component (such as a web browser) and a communication component (such as access to the internet). The user interface 1112 receives the query from the user, provides the query to the search engine 1102, receives the search results from the search engine 1102, displays the search results for the user, receives feedback from the user regarding the search results, and provides the feedback to the search engine 1102.

Figure 3:
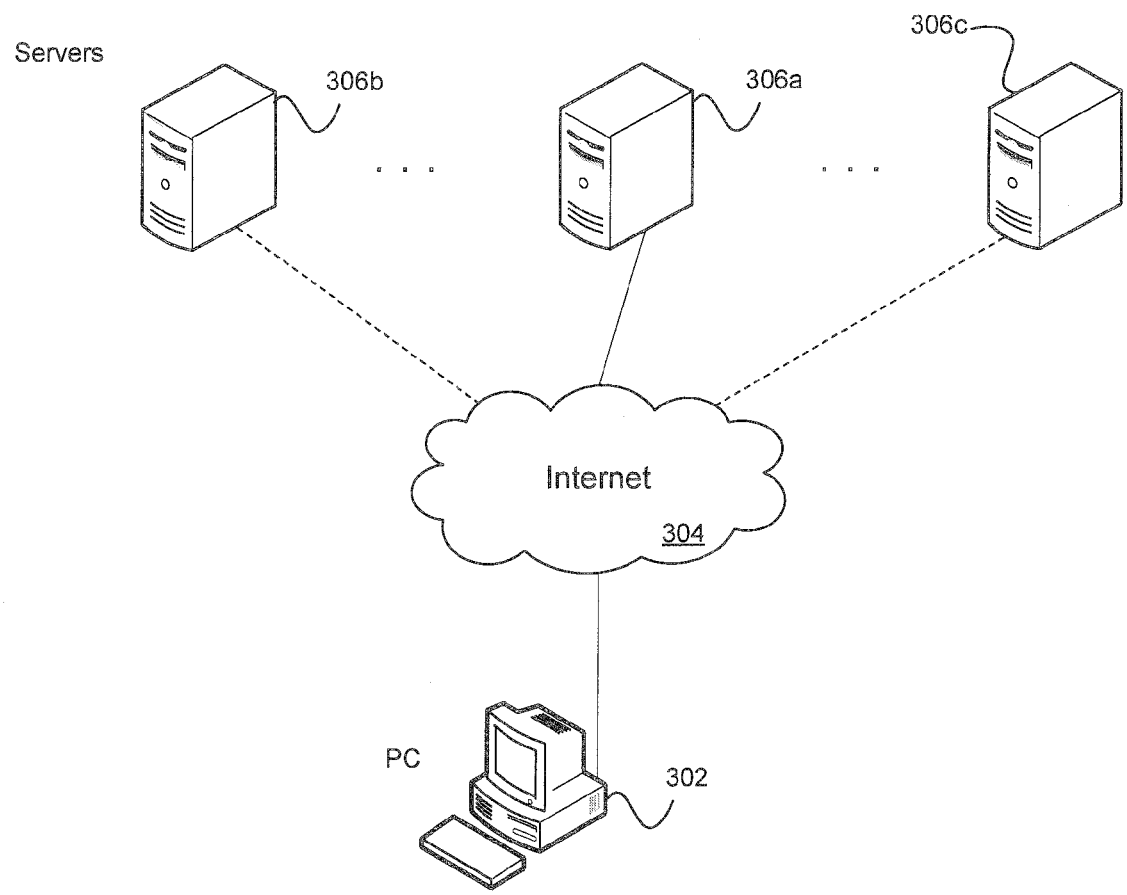
FIG. 3 is a block diagram of a client-server system that may be used to implement the search engine system of FIG. 1.

The search engine system 1100 may be implemented as one or more computer programs executed on a client-server system connected via a computer network such as the internet (see FIG. 3).

According to one embodiment, the search engine system 1100 performs its own web indexing. In such an embodiment, the search engine 1102 includes or interfaces with spider or crawler components and indexing components. In such a case, the information in the search database 1104 results from the web indexing process performed by the search engine system 1100.

According to another embodiment, the search engine system 1100 interfaces with another system (not shown) that performs the web indexing. The search engine system 1100 then provides the query to the other system (not shown) and receives the search results from the other system (not shown). In such a case, the information in the search database 1104 results from the search results received from the other system (not shown). The search engine system 1100 may communicate with the other system (not shown) via a computer network, for example, the interne (see FIG. 3).

Although some of the components of the search engine system 1100 are referred to as "databases", this term is to be considered broadly to generally refer to structures for storing data. The term "databases" should be understood to refer both to discrete databases as well as to tables (or other data structures) within a database. For example, according to one embodiment, a user feedback database includes a user feedback search table (corresponding to the user feedback search database 1106). The user feedback database may further include a profile table, a points table, a catalog table, and a dictionary table. (Profiles, points, catalogs and dictionaries are more fully detailed in subsequent paragraphs.) According to another embodiment, a profile table and a points table may be included in the user profile database 1110. According to another embodiment, the search engine 1102 may itself be a database that includes a user feedback table (corresponding to the user feedback search database 1106), a search table (corresponding to the search database 1104), a dictionary table (corresponding to the dictionary database 1108), and a user profile table (corresponding to the user profile database 1110).

Further details regarding the search engine system 1100 are provided below.

Figure 2:
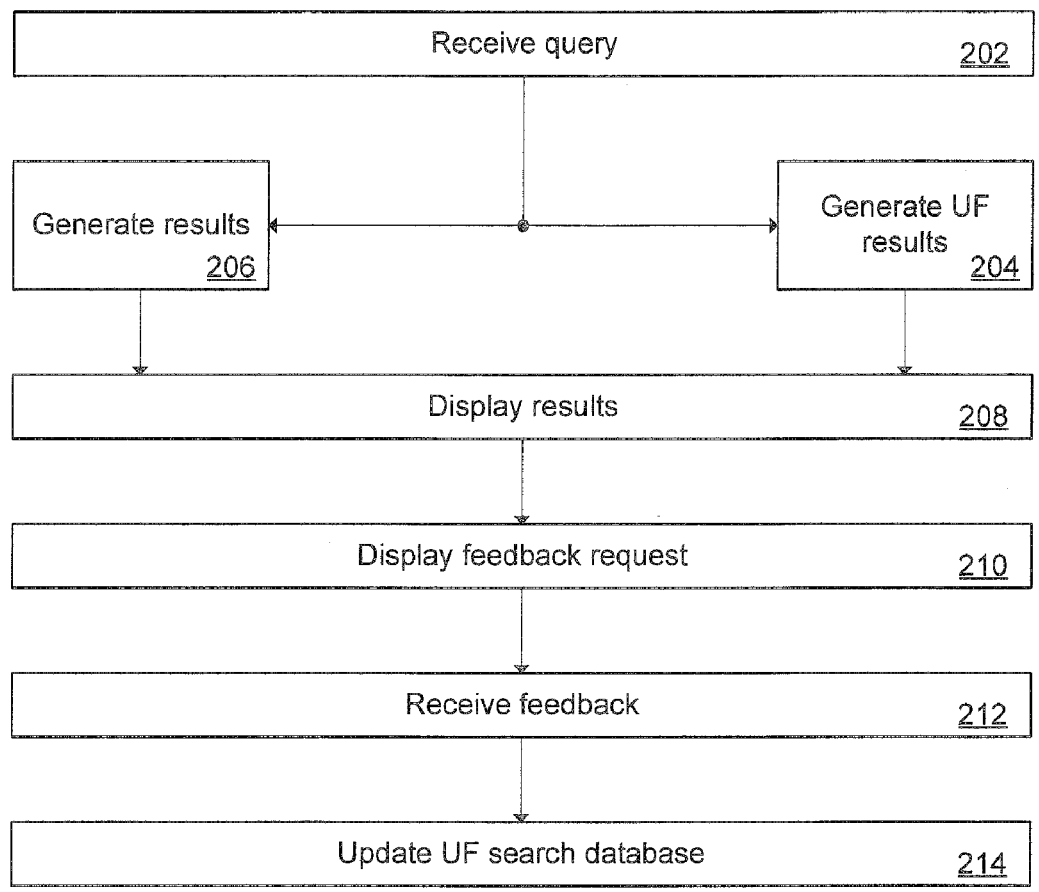
FIG. 2 is a flowchart of a method according to an embodiment of the present invention.

FIG. 2 is a flowchart of a method 200 according to an embodiment of the present invention. The method 200 may be performed by the search engine system 1100 (see FIG. 1). The method 200 may be implemented as software on one or more computer systems (see, for example, FIG. 3).

In step 202, a query is received from a user. For example, using the search engine system 1100 (see FIG. 1), the user enters a query into the user interface 1112, which communicates the query to the search engine 1102.

In step 204, a set of user feedback search results are generated using the query. These search results are obtained from a database that includes user feedback data. For example, the search engine 1102 accesses the user feedback search database 1106 using the query, to generate the user feedback search results.

In step 206, a set of regular search results are generated using the query. These search results are obtained from a different database than accessed in step 204. For example, the search engine 1102 accesses the search database 1104 using the query, to generate the regular search results. (The descriptor "regular" in reference to these search results is used merely as an identifier or label in order to differentiate them from the user feedback search results, and is not intended to impart any functional qualifications or limitations.)

In step 208, the user feedback search results are displayed according to the user feedback data. For example, if the user feedback data relates to user recommendations, then the user feedback search results may be ordered with the most recommended result at the top. For example, the search engine 1102 provides the user feedback search results to the user interface 1112 for display.

Also in step 208, the regular search results are displayed. For example, the search engine 1102 provides the regular feedback search results to the user interface 1112 for display.

The user feedback search results may be displayed separately from, or intermixed with, the regular search results; the various display options are discussed in more detail below.

In step 210, a feedback request is displayed regarding a particular search result. For example, according to one embodiment, when the user mouses over a search result URL, that website appears in an iframe layered over the search results page. The iframe includes the feedback request "Do you recommend this website?" For example, the search engine 1102 provides the feedback request to the user interface 1112 for display when the user selects a particular search result.

According to another embodiment, the user mouses over a thumbnail image of the website next to the search result URL for the website to appear in the iframe.

According to another embodiment, the user clicks on the search result URL, and the user is taken to a new web page with a header frame and a body frame. The header frame is produced by the search engine and includes the feedback request. The body frame shows the website whose search result URL was clicked upon.

In step 212, feedback is received from the user in response to the feedback request. For example, according to one embodiment, the user may click "Yes" or "No" in response to the feedback request. For example, the user interface 1112 provides the feedback from the user to the search engine 1102.

In step 214, the user feedback search database and the user feedback data is updated in response to the feedback. For example, if the selected website was not previously in the user feedback search database, it is added. The user feedback data for the selected website is updated to reflect the feedback. Furthermore, the query that generated the search results that included that selected website is associated with that selected website in the user feedback search database. Thus, when a similar (or the same) query is made in the future, that selected website may appear in the search results. For example, the search engine 1102 updates the user feedback search database 1106 with the feedback related to the selected website, and also relates the query with the selected website.

Thus, using the method 200, websites and their related feedback become populated in the user feedback database 1106.

More details regarding these steps, as well as additional features, are provided below.

FIG. 3 is a block diagram of a client-server system 300 that may be used to implement the search engine system 1100 (see FIG. 1). The system 300 includes a client computer 302, a computer network 304, and one or more servers 306a, 306b and 306c (collectively "servers 306").

The client computer 302 may be a personal computer that executes an operating system such as Linux™ or Microsoft Windows™ or Mac OS™. The client computer 302 may execute a web browser program such as Microsoft Internet Explorer™ or Mozilla Firefox™. The web browser program allows a user to navigate the web over the computer network 304 and to access the servers 306. The client computer 302 may implement the user interface 1112 (see FIG. 1).

The computer network 304 may be a local area network, a wide area network, or the internet.

The servers 306 may be computer systems that implement the search engine 1102 and other components of the search engine system 1100 (see FIG. 1). For example, the server 306a may implement the search engine 1102, the server 306b may implement the search database 1104 and the user feedback search database 1106, and the server 306c may implement the user profile database 1110 and the dictionary database 1108. The servers 306 may include a processor, a bus, a memory, and a hard drive.

The servers 306 may execute a computer program to implement one or more aspects of the search engine system 1100 (see FIG. 1). For example, the computer program may create and manage databases and data tables that store data used by the computer program. The computer program may include instructions for the servers 306 to execute in order to implement the methods and processes of aspects of the present invention. The computer program may be tangibly embodied on a computer readable medium such as a magnetic disk, a magneto-optical disk, a flash memory, a random access memory, a read only memory, a programmable read only memory, an erasable programmable read only memory, etc.

Further details regarding embodiments of the present invention are provided below.

Figure 4:
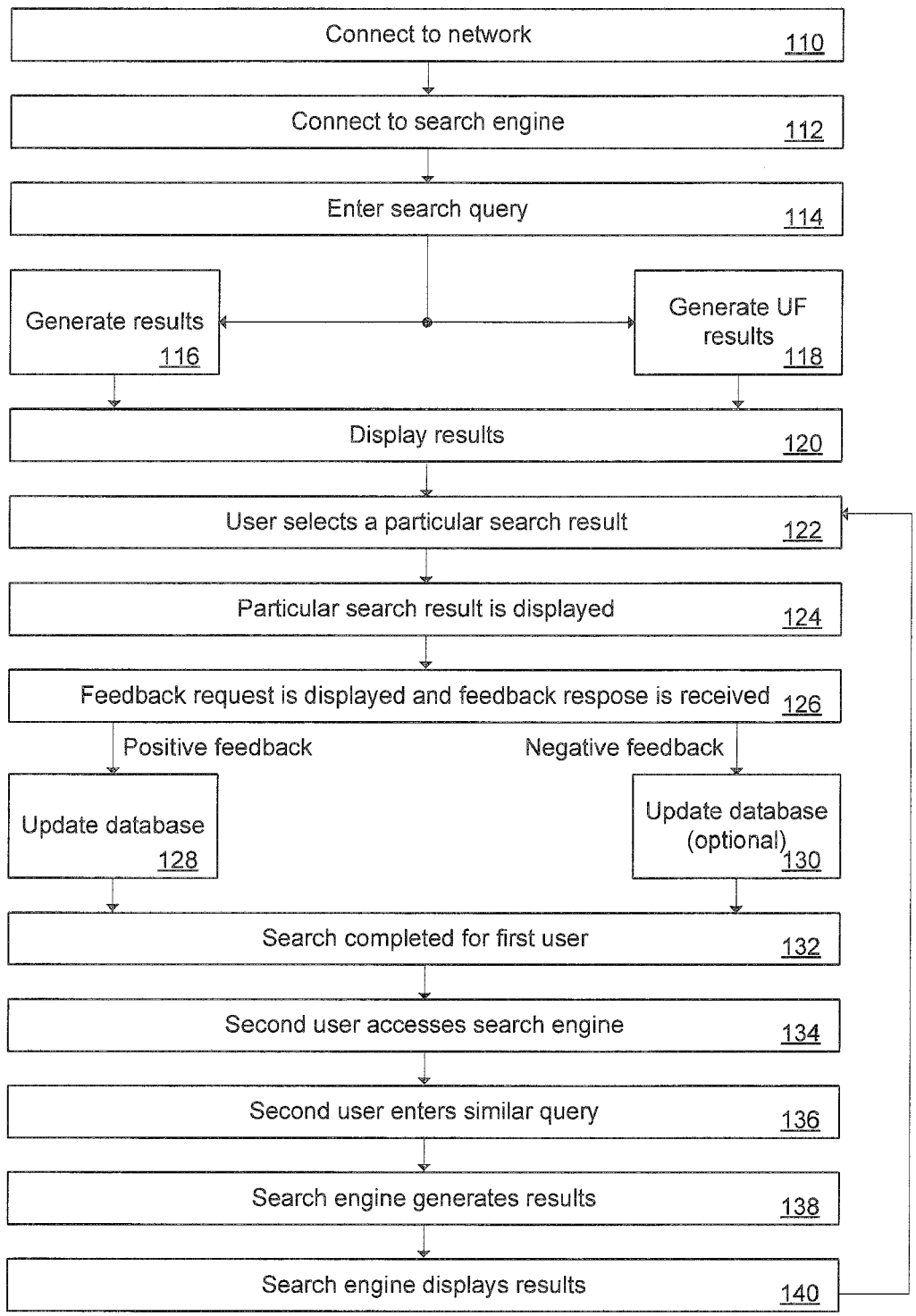
FIG. 4 is a flowchart of a search process according to an embodiment of the present invention.

FIG. 4 is a flowchart of a search process 400 according to an embodiment of the present invention. The search process 400 may be implemented by one or more computer programs executed by one or more components of the search engine system 1100 (see, for example, FIG. 1 and FIG. 3).

In step 110, a user hooks into the internet or another interconnected computer distributed system. The user may have a computer hooked up to the internet through some means of telecommunication such as a phone line, cable line, satellite, etc. The computer network may be the internet or some other system of telecommunication through networked computers or another such medium of interconnected electronic devices. For example, with reference to FIG. 3, a user may access the computer network 304 using the client computer 302.

In step 112, the user uses the computer or another like device and types in search engine URL to reach the search engine website. The user may go to the search engine on the internet by using an internet browser program. In an alternative embodiment, the user may download and use a search engine browser plug-in or a specialized search engine software program onto their computer or internet capable device. For example, with reference to FIG. 3, the user uses a web browser program to access the server 306a.

In step 114, the user enters a query into the search box on the search engine website. The query may include one or more keywords. For example, with reference to FIG. 3, the server 306a serves to the client computer 302 a web page that includes a search box.

In step 116, the search engine searches other search engines (meta-search) or web sites or its own crawled and indexed database of websites. The search engine may produce results by way of meta-searching other websites or other search engines or its own indexed database of websites. The results that are obtained from these searches may also be parsed, thrown into an array (or similar software technology), sorted, reformatted, and shown to the user through an HTML-generated web page (or through any other similar technology to present the aggregated data to the user). For example, with reference to FIG. 1 and FIG. 3, the server 306a accesses the search database 1104.

In step 118, the search engine searches its own user feedback search database that may reside on the search engine's server. (The search engine may also be a database driven search engine of another type, which may use other methods to index websites into a database.) The search engine looks for keywords in the indexed user feedback search database that match the user's typed in query. (These keywords include any data and text that were parsed from a website by the search engine's crawler or spider program.) The search engine then assembles the corresponding URLs or website addresses that correspond to the matching keywords or otherwise match the search query into an array (or similar software technology), which may then sort and reformat those results into an HTML-formatted web page that may be shown to the user. For example, with reference to FIG. 1 and FIG. 3, the server 306a accesses the user feedback search database 1106.

In step 120, the results are shown to user in the form of URLs to other web sites. The search results that are produced by the search engine may be displayed on a results page that shows anywhere from one to numerous search results. These search results may be shown as a website URL followed by a short description of the website associated with the URL. The results from searching in step 116 and step 118 may be displayed on the same results page. For example, with reference to FIG. 3, the server 306a serves to the client computer 302 a web page listing the search results.

In step 122, the user selects a result by clicking on a web site address URL. As discussed above, the "user recommended" search engine according to an embodiment of the present invention may differ from a regular database driven, crawled/indexed, search engine. The "user recommended" search engine according to one embodiment may be a method or apparatus to further enhance and refine the search results generated by a regular, database driven, crawled/indexed search engine. However, according to an alternative embodiment, the "user recommended" search engine may operate independently without a traditional index/crawled component.

In step 124, the user is taken to new page on search engine web site. Alternatively, the same web page may be refreshed or may generate a popup, pop-under, or graphic or animation or web page may show up in an inline frame ("iframe") or similar technology. For example, with reference to FIG. 3, the server 306a generates the search results web page that opens an iframe when a search result is selected.

In step 126, the new page has a header frame that asks the user to give a feedback response to the web site. For example, the header frame may say, "Do you recommend this website, yes or no?" Below the header frame is the entire web site (the web site whose URL was clicked upon) in a different frame (for example, in the body frame).

Instead of in the header, the feedback request may be at the top, bottom, or middle or anywhere on the page; or contained in a pop-up, or pop-under; or in a graphic, animation or iframe; or similar technology. The feedback request may be in the form of a question. The user may then click "Yes" or "No" or "Recommend" or "Not recommend" or may make a similar feedback response to the feedback request. Below or above or behind or in front of the feedback request may appear the website the particular user is recommending or not recommending.

As a specific example, the verbiage "Do you recommend this website, yes or no?" appears in a header. Below such verbiage appears the website they are recommending. This website may be shown using an iframe (or another similar technology that shows the user two websites on the same html page) while the search engine's header may be above this website in another frame such as an iframe or similar technology. Specific technologies that may be used to implement this functionality include asp, .net, coldfusion, or other server/client or browser related technology (or any technology that allows a user to show a portion of one website on the same page as a portion or entire web page of another website).

In step 128, if the feedback response is "yes", the selected URL is stored along with corresponding query in a database. For example, with reference to FIG. 1, the feedback, the query and the URL may be stored in the user feedback search database 1106.

In step 130, if the feedback response is "no", the selected URL is not added to the database. In an alternative embodiment, the "no" recommendation may also be recorded in database. For example, with reference to FIG. 1, the feedback, the query and the URL may be stored in the user feedback search database 1106.

After the user has responded "Yes" or "No", the recommendation or lack of recommendation may be stored in the search engine database in a "User recommended" database table or in a user feedback search database along with the user's entered keyword(s) (in this case, the keywords being referred to are the search terms the user entered into the search box) and the user recommended website address URL. As a specific example, with reference to FIG. 1, the feedback, the query and the URL may be stored in the user feedback search database 1106.

In step 132, the search has been completed for that user. (Rewards for that user are discussed in a subsequent section.)

Thus, by performing the steps described above, the user feedback search database becomes populated with user feedback search results. As an example, with reference to FIG. 1, the feedback from the user regarding the results from the search database 1104 or the user feedback search database 1106 is fed back to populate the user feedback search database 1106.

As the user feedback search database 1106 becomes populated, its results may be also be provided to users, as described in more detail below.

In step 134, a second user comes to the search engine.

In step 136, the second user types in the same query as the first user. Alternatively, the two queries can be similar (as further discussed below). The query may be entered into a search box on the webpage for the search engine.

In step 138, the search engine searches its user feedback search database, and/or searches its regular search database, and/or searches (or meta-searches) other web sites, using the query. The search engine software program may first check the search engine database in the "user recommended" database table (or alternatively, the user feedback search database) to see if any "user recommended" keywords are already recorded in the database that match those of the search query keyword. For example, with reference to FIG. 1, the search engine 1102 searches the search database 1104 and the user feedback search database 1106.

In step 140, on the results page, the user recommended search results may be displayed in a section called "user recommended web sites". These results may include the URLs associated with keywords that were placed in the user feedback search database from the previous user's recommendations. The "user recommended websites" on the results page may be listed before the regular search results. Alternatively, the "user recommended" search results may be intermixed with the "regular" search results, or shown after the "regular" search results. The second user may then provide feedback as discussed above (steps 122, etc.).

Figure 5:
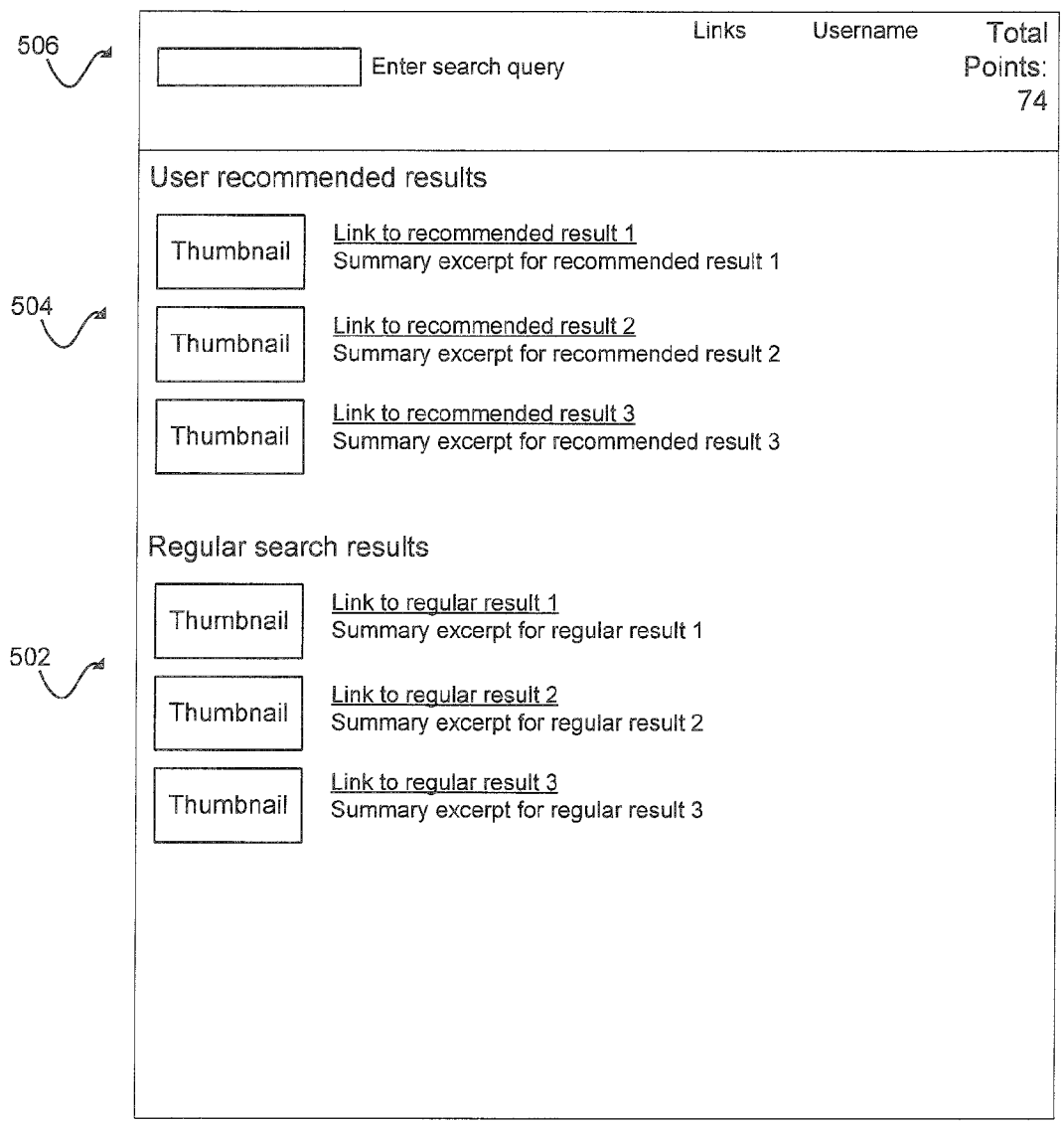
FIG. 5 shows as an example of the search engine search results HTML page from a user feedback search engine with points according to an embodiment of the present invention.

FIG. 5 shows as an example of the search engine search results HTML page 500 from a user feedback search engine with points according to an embodiment of the present invention. At the top of the webpage is the user recommended results area 504, which includes the heading "User Recommended Results" and below this heading are the websites that were recommended by different users. Below "User recommended results" is the regular search results area 502. The results may be displayed as a clickable link to the search result webpage along with a short summary of the information on that webpage. Thumbnail images of the websites corresponding to the search results may be displayed next to the search results. This page also has the search engine header area 506 which contains useful information such as the username of the current logged-in customer, and links to various web pages within the search engine website, such as the user's account page, a shopping cart page, and a logout link. In the header area 506 there is a big bold title which reads "Total points: 74". This is a point total the current logged in user has accumulated through performing searches and/or recommending (or not recommending) websites to other people.

Figure 6:
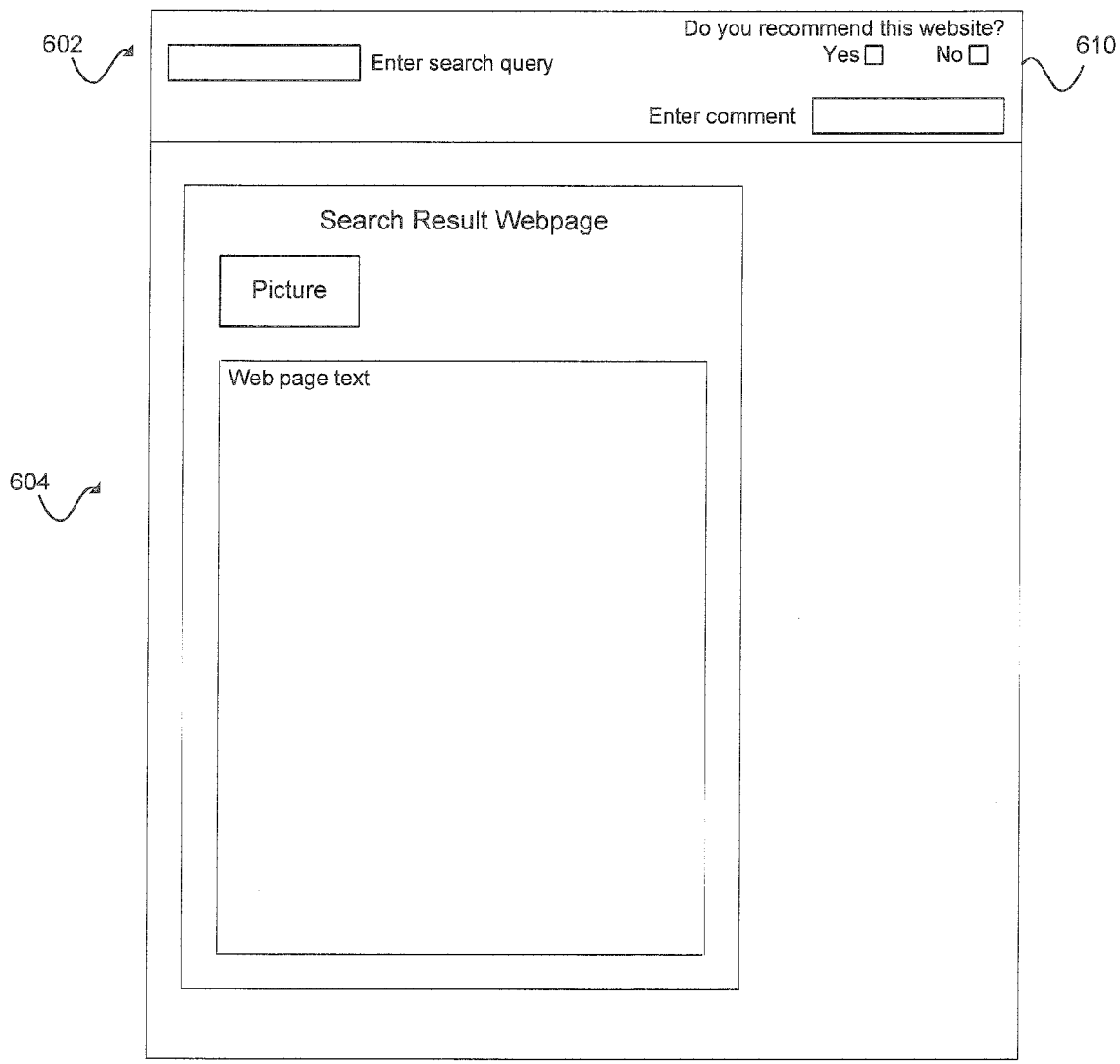
FIG. 6 shows an example of a search result click through webpage from a user feedback search engine with points according to an embodiment of the present invention.

FIG. 6 shows an example of a search result click through webpage 600 from a user feedback search engine with points according to an embodiment of the present invention. The webpage 600 appears when the user clicks on (or mouses over) a search result. (For example, the webpage 600 may appear as an inline frame when the user mouses over one of the search results shown in FIG. 5.) The webpage 600 includes two webpages in two iframes: a header iframe 602 and a body iframe 604. The body iframe 604 appears within the header iframe 602. According to another embodiment, the body iframe 604 appears below the header iframe 602.

The header iframe 602 includes the search engine header 610. The search engine header 610 shows the search engine's information, such as the total points and the feedback request. A user can then recommend a site by clicking "Yes" or "No" in the search engine header 610 where it asks the user "Do you recommend this site?" The user may also enter a comment about this particular website. This comment may be viewable to all those to who view this search result if the user recommends (or perhaps doesn't recommend) this website. According to another embodiment, the user may leave a comment for a website without providing a recommendation or other feedback.

The body iframe 604 shows the website whose URL was clicked upon from the search results (see FIG. 5). The body iframe 604 shows the entire website so the user may go through it and make his or her opinion as to whether to recommend this site to other people or not.

The search engine may produce anywhere from one to any number of search results on one page or multiple pages, depending on how many users have recommended how many unique websites, and the design preferences. According to one embodiment, up to ten user-recommended search results may be displayed on each HTML page, with a link to the next page of user recommended search results.

How many search results that are presented per page may be adjusted according to the programmer's software settings. As more users use this type of search engine, more and more users will recommend or not recommend websites. This information will grow in the database, and allow for more accurate search results. The system will rank web site address URLs based on how many users have recommended them. For example, if 47,345 users have recommended website A when the search query keyword "Cat" is typed in, and 2,343 have recommended website B when the search query keyword "Cat" is typed in, then website A will appear higher in the rankings than website B.

An alternative embodiment or an additional feature/method to rank user recommended websites includes recording recommended URLs in the database and assigning a "+1" point to each user recommendation. Each URL that was not recommended by a user (by a user clicking on "No" or clicking on similar verbiage when asked whether they recommended a particular website to others) will be recorded in the database and assigned a point of "−1." Then the sum of all the positive recommendations and the negative recommendations for a particular URL will produce a "score" for that unique URL. Then all URLs may be sorted in descending order according to their score, with the highest score coming first and the lowest score coming last. For example, if the URL <www.monkeys.com> has five users that recommended that particular website, then this URL will have five "+1" points assigned to it, which therefore equal +5. If three users did not recommend this website, then there will be three "−1" points assigned to this URL (which equals −3). The software search engine program takes the sum of the positive and negative points to produce the score. In this case, +5 plus −3 equals +2 (5+−3=2). Therefore the score assigned to the URL <www.monkeys.com> is +2. If another website like <www.coolmonkey.com> has a score of +1, then in the search results under the "User Recommended Results" heading, <www.monkeys.com> will appear higher in the rankings (higher on the search results webpage) and will come before <www.coolmonkey.com> because there are more net positive recommendations for <www.monkeys.com> (2 net recommendations) than for <www.coolmonkey.com> (1 net recommendation).

Limitations in the software may also be placed to prevent each unique user from recommending a website more than once. For example, user Z will not be able to recommend website <x1y3z123.com> more than once. Since the user will have opened up the search engine website in a browser or similar technology, the search engine software (through the use of cookies, IP address or other similar browser or server based software technology) will disallow a user from recommending a site more than once. In an alternative embodiment, users may recommend a website however many times they want. For example, with reference to FIG. 1, the user profile database 1110 may store information indicating the websites a particular user has recommended.

In another alternative embodiment or additional feature to the current embodiment, users may enter comments regarding a particular website in addition to recommending it or not. For example, in the header frame where the user has an option to recommend a particular website by clicking "yes" or "no", there may be a text box below the "Yes" or "No" buttons that allows users to enter a text comment. This text comment may appear under the website URL in the User Recommended results the next time a user enters the search query that brings up the aforementioned website URL. For example, with reference to FIG. 1, the user feedback search database 1106 may store comments as well as the feedback.

According to one embodiment, a user may be prevented from recommending a site more than once or gaining "points" (points are described in more detail below) indiscriminately. The search engine/software program may track users using their IP address. Once an IP address is recorded for a particular computer, the software program may be used to prevent users from recommending a site more than once and/or searching and/or gaining points for the same exact keyword more than once. For example, if a user searches for the word "Dog," the user's IP address gets recorded in the database and corresponds to the keyword searched which is also recorded in the database. If the user returns to the site later on, the same user cannot again get points for searching the word "Dog" again. Since "Dog" has already been recorded and associated with the user's IP address, that user cannot gain points for conducting this search again. This helps prevent a user from creating software programs to repeatedly gain points.

According to one embodiment, users also cannot recommend a particular website more than once. For example, if a user recommends the site <www.cat.com>, the user cannot recommend the <www.cat.com> website again. This is because the program has recorded this user's IP address and placed it in the database, and has associated this IP address to the website <www.cat.com>. If the same IP address tries to recommend this same site again, the program will not allow it. This can be accomplished by graying out the recommendation buttons or by hiding the options to recommend once user has already recommended (or not recommended) a site once. One advantage of this feature is to prevent users from artificially increasing (or decreasing) the rank of a certain website. Another advantage is to prevent users from gaining excessive points on the search engine website by recommending or searching the same keywords through the means of either a manual system or computer software program.

An alternative embodiment to the regular, overall recommendation system is another embodiment that allows users to recommend websites based on different criteria such as readability, organization, appearance, relevant content, security, lack of pop-ups, best animation, best video, best free websites, best fee based websites, timeliness and other types of criteria. In such an embodiment, instead of the feedback request "Do you recommend this website", another feedback request such as "Does this website have timely information" may be made.

Favorites

An additional way users can benefit from the recommendation system is to allow users an HTML page (or similar rendered internet page) whereby they can view all their sites they have recommended. In that way, users are in a way viewing their recommended sites in a similar manner as they would their "favorite links" from their browser software such as Microsoft Internet Explorer™. The search engine software program running the search engine website saves their recommended links (as associated with the user via cookies or other login or identification data) to a page labeled "my recommended links" or a similar label. This HTML page (or aspx page or any page able to be rendered by an internet browser) has all the website URLs that a particular user has recommended in the past. These recommended websites may be displayed on an HTML page (or any page able to be rendered by an internet browser or similar technology) or multiple HTML pages (or multiple pages able to be rendered by an internet browser) in alphabetical order (or in an order determined by user or programmer).

For example, a user may recommend the website <www-.zebra.com>. The user may then go to a different section of the search engine website or a different page on the search engine website and click on a page that shows all the user's past website recommendations, sorted by alphabetical order by keyword (for example). The user may scan the keyword "Zebra" down the page and see the <www.zebra.com> website underneath the "zebra" keyword. One advantage of this is that a user is then able to log onto the search engine website from any place in the world and click on the "my recommended links" page (which may be in HTML or any other type of page able to be rendered by an internet browser) and is able to see his/her favorite links. The user is therefore able to take his/her favorite links anywhere he/she goes. Many existing web browsers are installed locally on a user's machine and the "favorites" do not travel with that user. This may be contrasted with an embodiment of the present invention, in which the saved recommendation links are able to be accessed by anyone, anywhere there is internet access (or any future type of interconnected computer system).

Figure 7:
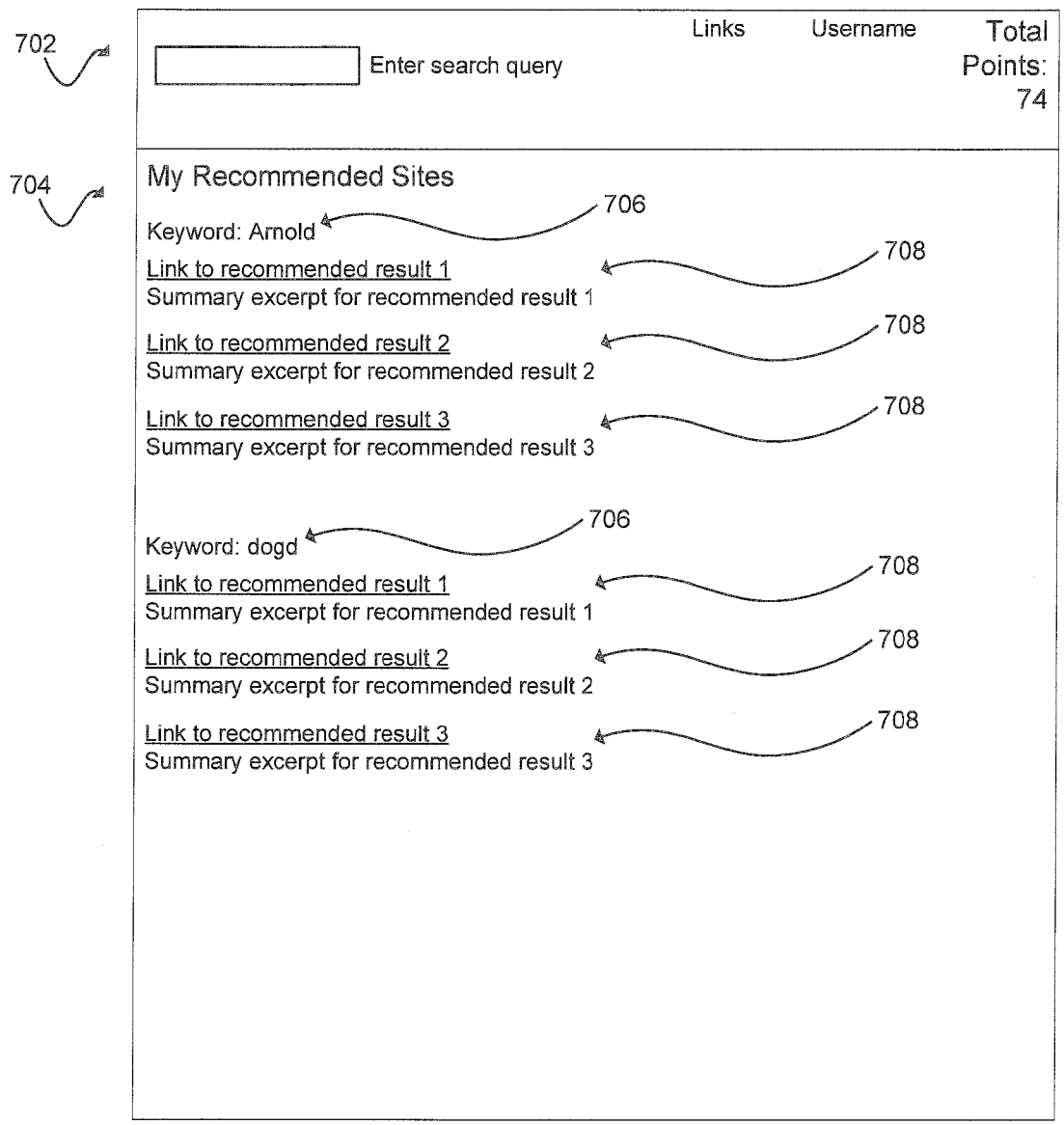
FIG. 7 shows an example of a "My Recommended Sites" HTML webpage from a user feedback search engine with points according to an embodiment of the present invention.

FIG. 7 shows an example of a "My Recommended Sites" HTML webpage 700 from a user feedback search engine with points according to an embodiment of the present invention. The webpage 700 has a header area 702 that includes search engine information such as the search box, search engine links, and the user's point total. The webpage 700 includes a body area 704 that has the title "My Recommended Sites," under which are a number of keyword areas 706 and link areas 708. The keyword areas 706 shows the keywords (e.g., "Arnold", "dogd") that were stored after this user recommended these particular websites. The link areas 708 show the links (that the user has recommended) that are associated with those keywords. A summary of the information on the webpage related to the link may also be displayed near the link. Each of the URLs and their associated keywords may be saved to this webpage 700, so that the user may come back, scan through all the keywords (which may be sorted in alphabetical order) and underneath the keywords see the favorite websites he/she has recommended.

Dictionary Data

An additional method to refine user recommended search results is to use dictionary data. The search engine software program may also use dictionary data to help further refine the search engine results. When a user recommends a particular website, the search engine software program may first analyze the keyword(s) used to find that particular URL (the "search query" or "keywords"). The keyword(s) that were entered into the search text box may all be checked against a dictionary database that has indexed English words into: (1) Nouns, (2) Verbs, and (3) Adjectives. The keywords that are either Adjectives or Verbs may be eliminated. Only the remaining nouns may then be stored in the database as keywords. These noun keywords will then have the recommended URLs associated with each one cross-indexed to it in the database. For example, with reference to FIG. 1, the dictionary database 1108 may store the dictionary data.

For example, if someone types "Dog running after Jack" as keywords in the search query text box, if in the search results page a website called <www.JacksDogs.com> comes up, and if the user recommends it, then the search engine software program may first check each word against the dictionary database to see how it is categorized. If any of the words are verbs or adjectives, like "Running" and "After", these words need not be stored or recorded into the database. Only the words "Dog," and "Jack" may be recorded in the database. The website <www.JacksDogs.com> is then cross-indexed to each of the nouns that were stored in the database; in this case, the <jacksdogs.com> website is indexed to both the "Dog" keyword and the "Jack" keyword. Therefore, after a user types in either "Dog", or "Jack" or "Dog Jack" or "Jack Dog," the website called <Jacksdogs.com> will show up as a user recommended website. This way of eliminating adjectives and verbs and allowing to record websites under the nouns in the search query helps to eliminate confusion and provide better quality User Recommended search results. If a user could record a verb or adjective keyword and have a website cross-indexed to that keyword(s), it could give undesirable results. For example, using the example of the search query, "Dogs running after Jack," if the search engine program recorded both the keywords "Running" and "After", and cross-indexed the Recommended website URLs to these two words, then every time someone types the word "Running" into the search engine text search box, the website <www-.JacksDogs.com> would come up. If the user types in "Running with Monkeys," the website URL <www.JacksDogs.com> would still come up. Running Monkeys may have nothing to do with Jack or his Dogs, therefore it would be undesirable to record/cache a website URL under an adjective or verb keyword.

Another example would be to cache a website under the keywords "throwing" and "Ball" instead of only "Ball." Therefore in this case, if a user afterwards types in "throwing ball", the user might get other recommended search results such as "throwing stars" "throwing knives" "throwing Frisbees", etc. This is because if a system records a verb like "throwing", than all URLs that have been recommended and then cross-indexed to the keyword "throwing" will come up. Since the user wants to know only about "Throwing ball" and not about throwing anything else, these other Recommended search results become less relevant and less useful.

Also, there is a problem if a search engine software program only stores search queries by using all keywords entered into a search box. For example, if the search engine software program records the entire search query "Dog running after jack" as a single keyword or keyphrase, then future users must type in the same exact words as this search query example in order to find the <www.JacksDogs.com> recommended website. Since few people will type in the same exact keywords, it is desirable according to one embodiment of the present invention to store and cross-index only noun keywords, as people will have most of their interest in a particular noun. According to another embodiment, all the keywords may be cross-indexed to a particular URL. According to yet another embodiment, keywords may be cross-indexed to a particular URL according to another set of criteria, such as only cross-indexing keywords that may be conjunctions, or prepositions, etc., or only cross-indexing keywords that are not conjunctions, prepositions, etc.

Thumbnails

An additional feature of an embodiment of the present invention is to post small thumbnail images of the click-through websites next to each search result URL. For example, the URL <www.bird.com> would have the thumbnail picture of the <www.bird.com> website next to the search result. When a user hovers over (or mouses over) the thumbnail image of the website, the entire <www.bird.com> website may come up in an iframe (or similar technology). For example, if one hovers over the thumbnail image of the <birds.com> website in the search results, then an iframe opens up that shows the entire <birds.com> website within that iframe. This allows users to scan through entire websites in a very quick fashion. Users may hover over each website's thumbnail sized picture, and each hover-over produces the corresponding website in a smaller sized frame. Instead of actually having to click on a search result URL to go to the corresponding website, users may just hover over the website's thumbnail picture, and the entire website may be shown in a smaller frame (using iframe technology or something similar) on the screen. Once the user is done looking at the website in the iframe, the user may simply move mouse cursor outside of the iframe, and the iframe may disappear.

Figure 8:
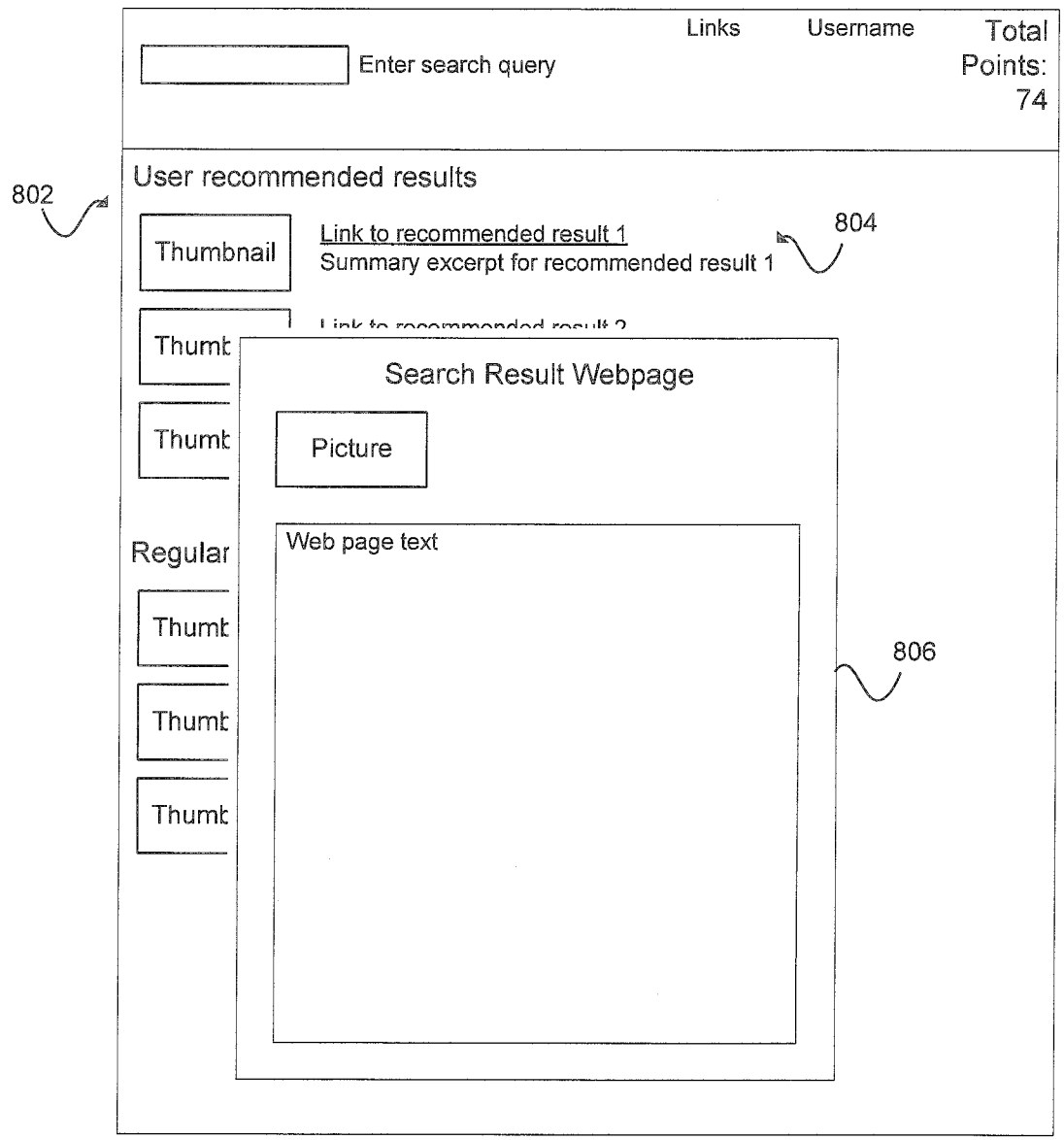
FIG. 8 illustrates an example of thumbnails on a webpage according to an embodiment of the present invention.

FIG. 8 illustrates an example of thumbnails on a webpage 800 according to an embodiment of the present invention. The webpage 800 includes a thumbnails area 802 and a links area 804. The thumbnails area 802 includes a number of thumbnails of webpages. The links area 804 includes a number of links corresponding to search results. The thumbnails in the thumbnails area 802 correspond to the webpages in the links area 804. When the user mouses over a thumbnail, a corresponding website 806 appears in an iframe or similar technology. The user can hover over different thumbnail images of different website URLs generated on the search result page of the search engine website. When the user moves the mouse pointer outside of the iframe, the iframe disappears, and the user may examine another search result webpage. (Further details regarding the appearing and disappearing iframe that is triggered through a mouse over are provided in subsequent paragraphs.)

According to another embodiment, instead of a thumbnail of the webpage associated with a link, an icon such as a magnifying glass may be displayed next to each link. When the user hovers the mouse pointer over the icon, the website 806 appears as described above.

Rewards

According to one embodiment of the present invention, users of the search engine accrue points for searching or providing feedback. These points may also be referred to as rewards, incentives or benefits. Each time a user recommends a website, or performs a search on the search engine website, the user accumulates points. For example, each time user clicks on the "recommend" button or performs one search (by typing a keyword into search text box and hitting "enter" button on keyboard), user will receive one point. If the user recommends (or doesn't recommend) three websites, the user will receive three points. As another example, if the user performs three different unique searches (such as typing "monkey" in search query text box and then hitting the enter button on the keyboard, then typing "zebra" in search query textbox and then hitting enter button, and then typing "bird" in search query textbox and then hitting enter button, then the user would receive three points. (See below regarding step 18 of FIG. 11.)

FIG. 9 shows an example of a "My account" HTML webpage 820 from a user feedback search engine with points according to an embodiment of the present invention. The webpage 820 includes a search engine header area 822, a rewards center area 824, and a personal information area 826. The search engine header area 822 includes the search box, search engine links, username, and the user's point total. The rewards center area 824 includes links to the rewards catalog, wishlist, shopping cart, and My Recommended sites. The personal information area 826 includes links a user can use to change their personal information, such as shipping information, email address, password, referrals, and logout.

FIG. 10 shows an example of a catalog webpage 840 from a user feedback search engine with points according to an embodiment of the present invention. The webpage 840 shows the items a user can purchase by exchanging points for merchandise from the catalog. The webpage 840 may include pictures of the items and the number of points it takes to purchase this particular item. A user can change the quantity of the items he would like to get by changing the number in the "QTY" box. A user can also add a particular product to his/her wish list, where they can view their favorite wish list items on a separate page. The webpage 840 may also automatically calculate if a user can buy a particular item or not by comparing the number of points a product takes to acquire it and how many points the user currently has on hand.

Figure 11:
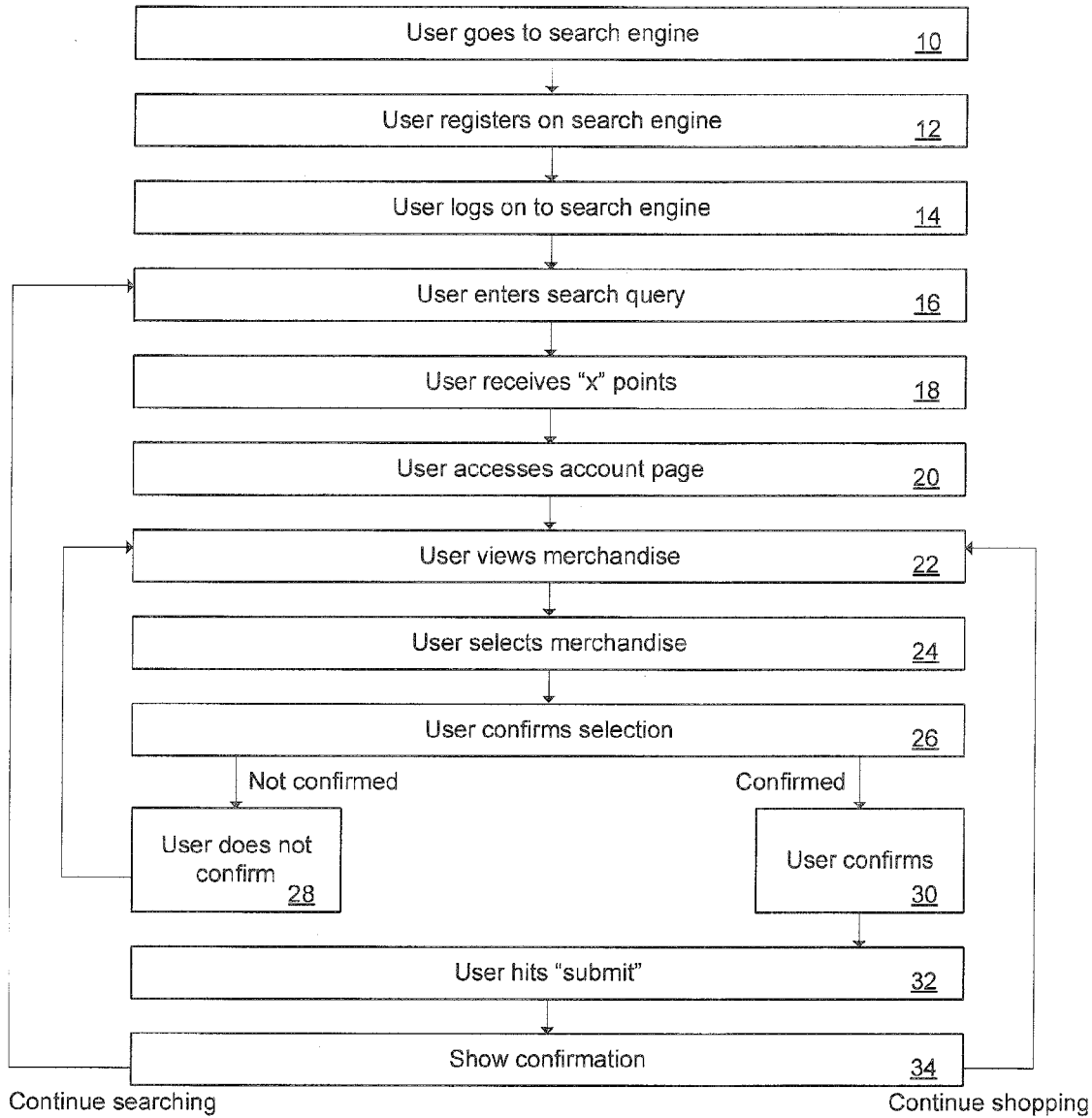
FIG. 11 is a flowchart showing more details regarding a feedback incentive process according to various embodiments of the present invention.

FIG. 11 is a flowchart showing more details regarding a feedback incentive process according to various embodiments of the present invention.

In step 10, the user goes to the search engine by typing a search engine URL address in a web browser. The web browser may be Microsoft Internet Explorer™, Mozilla Firefox™, or another type of browser. The user may also access the search engine through an installed toolbar or program installed on user's computer.

In step 12, the user registers on the search engine. The registration information may include the user's email address, username and password.

In step 14, the user logs into search engine web site using the user's registration information. This may include the user's email address and/or username and password (see step 12).

In step 16, the user performs a search on the search engine. This may include the user typing a keyword search query into a textbox on the web site web page.

In step 18, the user receives (earns) "x" number of points for using the search engine. The points may be granted for searching, for recommending or otherwise providing feedback, for leaving a comment about a particular site, or for all of the above.

In step 20, the user logs into or otherwise accesses an account page. The account page details the user's number of total accumulated points, among other information.

In step 22, the user is able to view merchandise or other benefits that the user can obtain using his/her points. These benefits may be displayed on the account page or another web page within search engine web site. These benefits are more fully discussed in another section of this application.

In step 24, the user clicks on one or more merchandise items and clicks a button to add the item(s) to the shopping cart or other online ordering scheme.

In step 26, the item(s) are added to the shopping cart and the user is asked to confirm his/her intention of exchanging points for the item(s).

In step 28, the user does not confirm by clicking "no". The item(s) are removed from the shopping cart, and the user is taken back to step 22.

In step 30, the user confirms by clicking "Yes". The user may enter other relevant information such as his/her shipping address.

In step 32, the user hits "Submit".

In step 34, a confirmation page is shown that the order has been received. The user's point total is adjusted. The user can go back to the merchandise page (see step 22) or to the search page (see step 16).

According to one embodiment, the user's point total may be displayed on the user's account page. According to other embodiments, the points may be displayed at the top, bottom, or middle of the user's computer screen (or in-between), on one or more pages of the search engine website (after user registers on the website of the search engine and logs-in). These pages may be generated using HTML or an equivalent browser type programming language. This "point total" may be an accumulation of all points that this particular user has received since the time the user first registered on the search engine website. The user can also click on an account page URL on the search engine's website (see step 20), which will open up a new web page which will show both the user's total number of points accumulated and what items can be redeemed/exchanged for those points (see step 22). On this account page (or perhaps a separate catalog page), there may be a list of items under the user's "total points" earned. These items may have descriptions that describe each item and will indicate to the user how many "points" are needed for this particular item.

For example, the user may have 10 points. The user may click on the account page and see an item such as a DVD player for 7 points. The user can then click on the image or description of the DVD player and then click on the button for next web page. Alternatively, the user may be automatically taken to the next web page (see step 24). The user will then be taken to a shopping cart website page which will confirm whether user would like to exchange points for the item (in this example, the DVD player) (see step 26). If the user does not agree, the user is taken back to search page or the main account page (see step 28). If the user agrees, the user may enter additional relevant information such as a shipping address (if the user did not already do so on main account page) (see step 30). The user may then click on "submit" to again confirm and actually initiate the transaction (see step 32). The points rewards software operates to allow the user to "purchase" the item with their accumulated points. A confirmation screen may be shown along with the user's new total number of points (since their points were adjusted after the user exchanged the points for merchandise) (see step 34). According to the example, the user exchanges 7 points in return for the DVD player. The user then has only 3 points left in the account. (That is, 10 points minus the cost of the DVD player which is 7 points equals 3 points remaining.) The user may then have the DVD player shipped to him by the search engine website company or by a partner of the search engine website. The user can then go back to the main account page or to the search page that has the textbox on it for searching.

Preview Window (Using an iframe) Example

As discussed above, the websites returned on the search results page may be displayed in a preview window (using an iframe) when the user mouses over a particular search result or website thumbnail (or similar graphical icon). This aspect of the present invention is more fully detailed in the following paragraphs.

On a search results page, each search result is hyperlinked to a web page. In order to assist users to vote on a search result (specifically a particular website) without going to the website by clicking a hyperlink to it, a method was created that enables users both to see a website and to recommend (vote) on the website by just previewing the site and not actually clicking and then going to the site. In other words, a user does not have to click on the hyperlink to see the website (which normally then opens up on a new webpage). A user simply "hovers over" or "mouses over" (places the mouse pointer over an icon, a thumbnail, or a hyperlink) and the resultant website opens up in a frame (specifically an iframe) on the search results webpage. The user can then view and navigate the resultant website in the iframe as the user normally would on a webpage, but when the user is done reading the information in the iframe, the user simply "mouses out" or stops "hovering over" or takes the mouse pointer outside of the bounds of the iframe, and the iframe disappears.

According to one embodiment, two main client side HTML components may be used: 1. DIV control; and 2. IFRAME control. Both controls are flexible to change the content dynamically and are able to be positioned anywhere on the screen easily.

The IFRAME control may be used to load any website content by navigating the frame to a particular website URL.

Since the IFRAME control may not be flexible enough to move around the screen, it may be embedded in a DIV control. In this case, the DIV control acts as a container that holds IFRAME as content. In the DIV control, there may be two client side mouse events that are used to interact with a user action while viewing the preview window.

An example of the code for DIV control and IFRAME control looks as follows:

```
<div id="divFrame"
  style="position: absolute; display: none; width: 80%; height: 80%;
  left: 11%; top: 20%; background-color: white;"
  onmouseover="fnSetInsideFrame( )"
  onmouseout="fnSetOutsideFrame( )">
  <iframe id="frameWindow1"
    style="display: none;width:100%;height:100%;"></iframe>
</div>
```

For each search result hyperlink, a JAVASCRIPT™ method may be called on a mouse over event. The JAVASCRIPT™ method is supplied with the respective hyperlink in the search result. The JAVASCRIPT™ method takes the supplied hyperlink and then processes it to load the IFRAME and position the DIV control in the appropriate location in the screen based on the screen X and Y scroll location.

Three main JAVASCRIPT functions may be used to show and hide the preview window: fnShowSite( ) timer( ) and fnHideSite( ).

The JAVASCRIPT™ function fnShowSite(this) is used to show the preview window with the search result URL loaded in the IFRAME. Here the preview window is the DIV control hiding and showing the IFRAME control.

The JAVASCRIPT™ function timer(4) is used to wait for a few seconds and call the fnHideSite( ) JAVASCRIPT™ function, which will hide the DIV component when the user moves the mouse away from the preview window, which indicates that the user is done with previewing the site.

The following code shows an example of how the JAVASCRIPT function is called which in turn loads the IFRAME with the respective URL.

```
<a target="_blank" id="thumbLink1" runat="server"
href='<%# DataBinder.Eval(Container.DataItem, "ActualUrl")%>' style="font-size: 10pt; color: #7777cc; text-decoration: underline; font-family: Arial, Tahoma, Verdana, Helvetica"

onmouseover="javascript:fnPreviewOver(this);fnShowSite(this);"
```

```
onclick="javascript:fnPreviewOver(this);fnShowSite(this);
return false;" onmouseout="timer(4)">
<img id="imgMagnifyRec" runat="server" src="/images/
magnify.jpg" border="0" style="visibility:hidden"
alt="Preview site"/>
</a>
```

FIGS. 12A-12C provide a more detailed example of the JAVASCRIPT™ functions that may be used to implement embodiments of the present invention, as discussed in the above paragraphs. The functions begin on FIG. 12A, continue through FIG. 12B, and end on FIG. 12C. The dashed line indicates the left margin, so that the indentation can be seen consistently among the figures. Exemplary details of the functions fnShowSite( ) fnHideSite( ) and timer( ) are provided.

The function fnShowSite( ) generally operates as follows. Using a Javascript object called "this", when the user mouses over or hovers over an icon/thumbnail or search result URL, the Javascript object picks up the search result hyperlink and the mouse position, takes this data, and passes it to the function fnShowSite( ) The function fnShowSite( ) makes the Div tag and the iframe tag visible, places the Div tag position relative to the mouse position, and uses the href hyperlink to load the iframe which is inside the Div tag.

The function fnHideSite( ) generally operates as follows. This function is called by the Timer function. After being called, this function hides the div tag which in turn hides the iframe.

The function timer( ) generally operates as follows. A number is assigned to this function which tells how many seconds it should take for the iframe to disappear once the user mouses out of the iframe bounds.

Personalized Search Results

Another embodiment of the present invention allows users not only to vote on search results, but also to add, move or remove search results to their own personalized list of search results. A user may modify the search results that the user gets by personalizing the user's search results. This personalization information may be stored in, for example, the user profile database 1110 (see FIG. 1).

According to one embodiment, the user accesses a configuration panel on the search engine website and identifies the user's personalization options. One such personalization option includes allowing the user to vote on a search result and have that search result only appear on the user's own search results and no one else's search results. The user has the option to change the options in the user's profile on the search engine account page to allow any modifications made to the search results to stay local and tied only to that particular user's account.

For example, a user would Recommend or Vote for a website that the user likes. This website is cross indexed to the keyword query the user typed in. The next time the user comes to the search engine website and logs in, and the user types in the same keyword as the user did last time (the keyword that brought up the website that the user Recommended or voted favorably for in the last example), then that website will show at the top of the user's search results. In this scenario, that website shows up only at the top of this particular user's search results and no other user's search results; it will not affect the search results for all users using the search engine; the search result will be saved to this user's profile and shown at the top only when this particular user searches for the same keyword.

As another example, the user may also choose to "Not recommend" or negatively vote for a particular search result. In this case, the website may be pushed to the bottom of all the search results for that particular keyword, or the search engine may not display this particular search result. (The search result may be a website URL that leads the user to a particular website.) In other words, the search engine may hide this particular search result from the user when the user types in the keyword query that would normally show this search result. Alternatively, the search engine may not show this particular search result to the user anytime the user types in any keyword query that may bring up this search result. In effect, the user is banning or disallowing this particular search result (for example, this particular website URL) from ever showing up on the search results page for this particular user any time this user types in any keyword search query into the search engine that brings up this particular website URL.

The user has the option to go into the user's account page on the search engine and change the options regarding the showing (or not showing) of recommended (or not recommended) search results. The user can reverse the changes the user has made so that all hidden search results show up again, or any search results that were recommended and shown at the top of the search results page are removed. This allows the user to see the search results in their original state, and/or in their original order, and/or in their original sequence.

The webpage displaying the search results may also display status information relating to the personalization options. For example, a symbol may be displayed next to a "recommended" search result to indicate that the user has previously personalized their results to include that particular search result. As another example, the webpage may include a message that the user's personalization options have been used to change the ranking or appearance of the search results.

The user may log in using their profile and password information. Alternatively, the user may automatically log in to embodiments of the search engine that use cookies or similar alternative methods of logging a user in automatically if the user uses the same computer continuously to visit the search engine.

Additional User Suggestions

According to another embodiment, users may click on a link and then enter information into a form (or enter a URL in a form directly from the search results page) that allows the user to suggest a website that may not currently be included on the search engine's results page. For example, the user might suggest a site called <Cats-are-silly.com> when the keyword "Cat" is entered as a keyword search query on the search engine page. This particular website may not appear in the search results when a user types in the aforementioned keyword (again "Cat"). Therefore, the user now has the opportunity to "suggest" a website for this particular keyword. This suggestion may then be shown on the page as a "User suggested website" or similar wording. This suggested website may be tied only to this particular user's profile and thus only show up when this particular user logs in to the search engine and types the "Cat" keyword query. Alternatively, this suggested site could be shown to all the users of the search engine when the "Cat" keyword query is searched. (The search engine may also cross-index a URL to both the singular form and plural form of a keyword; for example, in this case, the search engine may cross-index a URL to both "Cat" and "Cats". A search engine may also cross-index a keyword and one or more of its related synonyms, antonyms, etc. to a URL.)

For example, with reference to FIG. 1, the user feedback search database 1106 may store suggested websites that are available to all users. The user profile database 1110 may store suggested websites by the particular user. Furthermore, as discussed above regarding the personalization options, the websites suggested by the user may be shown in the search results of that user but not other users.

Tags

The search results page may also include a place next to each search result for a user to add a "Tag" or a word to help categorize a search result further. For example, if the user liked the website <A-birds-life.com> and had typed in "Bird" to find and view this website search result, the user may view the search result page on which this particular website appears in the search results and add additional "Tags" (or categories or keywords) in which the user would like to see this website appear again. The user has the option to save this information to the user's profile on the search engine or to have this website show up to all users of the search engine for all the additional tags this user has entered.

For example, the user could enter additional tags next to a search result. In this example, the user could enter additional Tags such as "Parrots, pigeons, geese, ducks, chickens" as additional "Tags" (or categories or keywords) under which the website <www.A-birds-life.com> could be categorized under. The next time the user types in "Geese" as a keyword search query into the search engine, the website <www.A-birds-life.com> would show up as the top search result on this particular users search results page. Alternatively, the search result would show in another place on the search result page to all users of the search engine with a designation that this particular search result came up because a User "Tagged" this search result.

The tags and the search result may be associated with the user if the user is logged into the search engine. Alternatively, this search result may show up for all users using the search engine depending on the search engine's programming or if this particular user has defined an option to allow all users using this search engine to see this search result when this particular user generated "Tag" has been typed in as a search query. Alternatively, this search result may show up if other users have selected an option on the search engine that allows or doesn't allow them to see other users' tagged search results. Alternatively, this search result may show up with some kind of designation that this particular search result came up because a User tagged this search result.

The tags may be entered on the search results page through a form or text box or similar input area using HTML, .NET, or another programming language.

For example, with reference to FIG. 1, the user profile database 1110 may store the tags that the particular user has associated with various search results.

Recommendation Alternatives

In an alternative embodiment to the regular way a user can vote on a search result (using the voting header mechanism described earlier in this invention description), users may vote for or against a search result (recommend or not recommend a search result) by clicking on a feedback request that appears directly next to (or above or below) each search result on the search results page. The user may vote on a search result by clicking "I like this result" or "I don't like this result" or similar wording that appears next to each search result. They user may also vote using a symbol such as a "thumbs up" or "thumbs down" symbol on the search results page. Both the "thumbs up" and the "thumbs down" symbols may be next to (or above or below) each search result. Users then have the option of clicking either the "thumbs up" icon or the "thumbs down" icon. Users therefore have the opportunity to vote on websites without seeing the website first. Alternatively, users may view a website, then go back to the search results, and then vote on that particular website. This embodiment forgoes the voting header frame, which may occupy the top portion of a webpage within a browser window (thus reducing the amount of words and images that can be seen on that particular webpage). According to another embodiment, the user may vote for a website using a separate program (such as a toolbar that may be integrated into the browser) that may be downloaded and installed on the user's computer. The user may then click on a "thumbs up" or "thumbs down" icon (or similar graphical image or wording) for each website a user recommends or doesn't recommend.

FIGS. 13A-13E show example data tables according to an embodiment of the present invention. As discussed above regarding FIG. 1, the term "database" as used in the present application is intended to be read broadly as referring to a wide variety of types of data structures, including data tables in one or more databases. In the embodiment of FIGS. 13A-13E, certain of the "database" elements of FIG. 1 are implemented as tables in a database labeled "iRazoo".

According to another embodiment of the present invention, a search database may contain a specific type of data or data source that users query. For example, according to one embodiment, three search databases may be implemented: a web database, a video database, and a news database. The web database may contain the URLs of websites on the internet. The video database may contain the URLs of websites that store videos. The news database may contain the URLs of websites that store news content. The websites in the databases may have been obtained by a crawler or other data gathering tool, or from another entity (that may itself execute the crawler). The general description of searching a specific type of content (or having a search database containing a specific type of content) may be referred to as a "vertical search". The database accessed when performing a vertical search may be referred to as a "vertical search database" or simply "search vertical".

According to another embodiment, the search engine system may also meta-search (or otherwise connect into) another vertically oriented search database or website, or it may crawl and then index its own separate vertical search database. As discussed above, a vertical search database is a database of website address URL's and descriptions that are organized into a particular category. For example, there may be a News search database that only has news article URLs indexed in its database. Another example is a video database that only crawls and stores video website URLs and their corresponding descriptions.

FIG. 13A shows 3 tables: BasketDetail, iRazoo_User, and Video_User_Comments. The table BasketDetail defines a data structure that stores information regarding a user's shopping basket product details (see FIG. 11 and related description). The table iRazoo_User defines a data structure that stores profile information regarding a user, such as their name, password, email address, how many referrals this user has made, is this user account activated or not, etc. (See also the user profile database 1110 in FIG. 1 and related description.) The table Video_User_Comments defines a data structure that stores the user's comments related to websites in the video search vertical that have no user recommendations made by that user.

FIG. 13B shows 3 tables: tellafriend_log, Video_User_Search_Mapping, and IPlocation. The table tellafriend_log defines a data structure that stores information relating to referrals such as the email addresses of the sender and receiver of the referral. This table is for referring users to the search engine. The table Video_User_Search_Mapping defines a data structure that stores each user recommendation for the video search vertical, and it also stores additional information such as if the user has recommended "yes" or "no", the user's IP address and username who has made that particular recommendation, any comments for this particular website, and the date these comments were made. The table IPlocation defines a data structure that stores information relating to the IP address range of all countries so that the search engine software may determine the geographic location of any user that uses the search engine.

FIG. 13C shows 5 tables: UserRecommended_Search, User_Search_Mapping, User_Comments, News_User_Comments, and News_User Search_Mapping. The table UserRecommended_Search defines a data structure that stores the URL and the description of the website, as well as the total number of recommendations made for that particular website. The table User_Search_Mapping defines a data structure that stores each user recommendation for the web search vertical (web database only), additional information such as if a user has recommended "yes" or "no", the user's IP address and username who made that particular recommendation, any comments for this particular website, and the date these comments were made. The table User_Comments defines a data structure that stores comments related to websites in the web search vertical that have no user recommendations that were made at the same time as the comments were made. For example, if a user comments on a website but does not recommended this website at the same time the comments were made, then the user's comments may be stored in this table. The table News_User_Comments stores the user's comments related to websites in the news search vertical that have no user recommendations that were made in combination with the added comment. The table News_User_Search_Mapping stores each user recommendation for the news search vertical, additional information such as if user has recommended "yes" or "no", the user's IP address and username who has made that particular recommendation, any comments for this particular website, and the date these comments were made.

FIG. 13D shows 2 tables: News_UserRecommended_Search and Product. The table News_UserRecommended_Search defines a data structure that stores a news search URL, the description of the news website URL, and the total number of recommendations made for that particular website. The table Product defines a data structure that stores information related to a list of rewards or prizes that can be exchanged by users for points.

FIG. 13E shows 3 tables: Basket, Points, and Address. The table Basket defines a data structure that stores information like whether items are wishlists or shopping baskets, if orders are completed or not, and tracks when the shopping cart gets updated. The table Points defines a data structure that stores information related to the points accumulated by a user. The table Address defines a data structure that stores information related to a user's shipping address.

As an example, when a user recommends a website in the web search vertical that has not been recommended before for the keyword the user has entered as his search query, a record gets inserted in the UserRecommended_Search table where the URL and the description is then stored. The database creates a new ID for the URL and keyword combination, and that ID from the UserRecommended_Search table is used to insert a record in the User_Search_Mapping table. The username, IP address, user comments, keywords entered, date and the recommendation (whether "Yes" or "No") also get stored in the User_Search_Mapping table.

Figure 14:
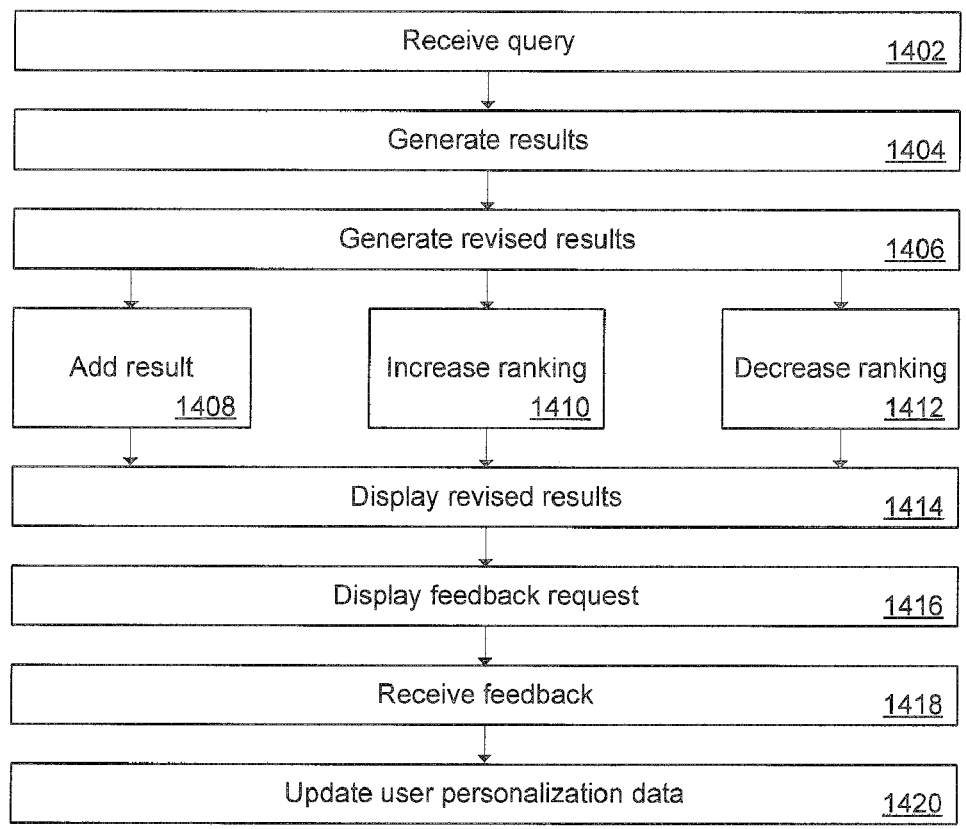
FIG. 14 is a flow diagram of a feedback process according to an embodiment of the present invention.

FIG. 14 is a flow diagram of a feedback process 1400 according to an embodiment of the present invention. The feedback process 1400 may be implemented by the search engine system 1100 (see FIG. 1). The data tables used in a specific implementation of the feedback process 1400 may be those described above with reference to FIGS. 13A-13C. Additional features of the feedback process 1400 are discussed in more detail above regarding other embodiments of the present invention.

The search engine accesses a variety of user personalization data. This user personalization data may be stored in the user profile database 1110 (see FIG. 1), in one or more of the tables described above with reference to FIGS. 13A-13C, or in other data structures.

In step 1402, the search engine receives a query from a user. This step 1402 is similar to the step 202 (see FIG. 2 and related description). For example, the search engine 1102 receives the query from the user's web browser via the internet 304 (see FIG. 1 and FIG. 3).

In step 1404, the search engine generates a set of search results using the query. The search engine uses the query to obtain the search results by accessing a database of search data. This search data may have been gathered and indexed as described above. Based on relevancy metrics and other information related to the query, the search results have a ranking. For example, the search engine 1102 accesses the search database 1104 to generate the search results (see FIG. 1).

In step 1406, the search engine generates a revised set of search results. The search engine uses the original set of search results (from step 1404) and the user personalization data to generate the revised set of search results. The process 1400 then splits in three ways according to the interaction between the original set of search results (from step 1404) and the user personalization data.

In step 1408, the user personalization data indicates that an additional search result (that is not in the original set of search results) needs to be added. The search engine adds the additional search result to the original set of search results to generate the revised set of search results. The revised set of search results then includes the original set plus the additional search result. The ranking of this additional search result may be increased so that it appears at the top of the revised set of search results.

The user personalization data may indicate that the additional search result needs to be added based on previous feedback by the user. This process is more fully detailed in the section Additional User Suggestions above.

In step 1410, the user personalization data indicates that the ranking of a particular search result needs to be increased. The search engine takes the original set of search results and increases the ranking of that search result, and the revised set of search results then includes the original set of search results with the ranking of that particular search result adjusted upward. The ranking may be adjusted so far upward that the particular search result appears at the top of the revised set of search results.

The user personalization data may indicate that the ranking of the particular search result needs to be increased based on previous positive feedback by the user. This process is more fully detailed in the section Personalized Search Results above.

In step 1412, the user personalization data indicates that the ranking of a particular search result needs to be decreased. The search engine takes the original set of search results and decreases the ranking of that search result, and the revised set of search results then includes the original set of search results with the ranking of that particular search result adjusted downward. The ranking may be adjusted so far downward that the particular search result is not even displayed in the revised set of search results.

The user personalization data may indicate that the ranking of the particular search result needs to be decreased based on previous negative feedback by the user. This process is more fully detailed in the section Personalized Search Results above.

In step 1414, the revised set of search results is displayed. The results may be displayed according to their ranking. The results may also be displayed with an indicator indicating that a particular search result was moved up due to having been added by the user's previous feedback, moved up due to the user's previous positive feedback, or moved down due to the user's previous negative feedback.

In step 1416, a feedback request is displayed regarding a particular search result. This step 1416 is similar to the step 210 described above (see FIG. 2 and related description).

In step 1418, feedback in response to the feedback request is received from the user. This step 1418 is similar to the step 212 described above (see FIG. 2 and related description).

In step 1420, the user personalization data is updated according to the feedback. The updating may also involve the query and the particular search result related to the feedback. For example, if the user recommends a particular search result, the user personalization data may indicate that the ranking of that particular search result is to be increased whenever that particular search result appears in the original set of search results (from step 1404). As another example, the query that resulted in a particular search result being recommended may be stored in the user personalization data, so that the particular search result may be added to the original set of search results when that query (or a similar query) is entered in the future.

For example, according to one embodiment, a user may suggest a search result (see step 1408) as follows. A "suggest a search result" request may be displayed in the user recommended results section, which may appear on the top of the first page of search results (or in any other location on the page). The user may then enter the URL to be suggested in a form box (or any similar internet related code that allows a client to enter information and send it to the server). The search engine software crawler then visits the URL and indexes the description of the website by parsing the Description Meta tag from the page (or may parse other textual information from other portions of the webpage and/or website). The URL and description along with the user information may then be stored in the UserRecommended_Search table, and a row may also be inserted in the User_Search_Mapping table to record the action as a user recommendation along with the user information, keywords, date, and comments if any. In addition, keywords or Tags may be entered by the user for the URL.

As another example, a user may associate a suggested "tag" for a website or other search result. The User_Search_Mapping table stores the user recommendation information like the keywords, date, whether recommended yes or no, the foreign key of the ID of the UserRecommended_Search table row, along with the user information. If a keyword (Tag) needs to be added for a URL, then a record may be inserted into the User Search_Mapping table for that keyword. The user interface (which is the web page) may include an input box or other query facility to enable the user to enter one or more keywords/tags for a particular URL.

Additional Embodiments

The user recommended search results may be displayed separately from the other search results. However, the user recommended search results may be displayed in other ways. The user recommended search results may be displayed above, below, to the left of, to the right of, in the middle of, or intermixed with, the other search results.

The user recommended search database may be maintained separately from the other search database. However, the user recommendations may be incorporated into the other search database. For example, the user recommendations may also be used as a factor in ranking the other search results.

A selected search result may be displayed in a frame on the search page. However, the selected search result may be displayed in other ways. A selected search result may also be displayed in a new window or on a new page.

The user feedback request may be displayed at the top of the selected search result. However, the user feedback request may be displayed in other ways. The user feedback request may also be displayed at the bottom, on the left side, on the right side, or in the middle of the selected search result.

The user feedback may be that the search result is "recommended" or "not recommended". However, the user feedback may given in other ways. For example, a rating over a range (for example, 1-5 or 1-10) may be provided, with "1" being "least relevant".

The user feedback may be in response to the question "Is this site recommended?" However, the user feedback may be given in response to other questions. For example, the question may be "Is this site recommended for bargains?" or "Is this site recommended for current information?" or "Is this site recommended for historical information?" or "Is this site recommended for children?", etc.

Embodiments of the present invention may include one or more of the following features. (1) The search engine uses human collaboration to produce different search results than a computer program alone can produce. In many cases, the search results will be more relevant. (2) Users can interact with their search experience rather than have a passive experience. (3) Human likes and dislikes can rank some search results higher than others, thereby allowing subjective tastes, rather than data, to produce a search result that may be more beneficial to users. (4) People can use their likes and dislikes to influence others. (5) The results may be more up to date, and the likelihood of "dead links" may be reduced. (6) The search results may more closely reflect popular culture and may reduce the likelihood of "old" or "stale" information. (7) The search engine software may be quicker and place a lower processing and/or memory load on a server than other search engines. (8) Users may be incentivized with points for using the search engine when a user performs a search on the search engine website. (9) By incentivizing users, the search engine creates loyalty among users who return to both benefit from the search engine's user recommended results and to gain points which they can redeem for benefits such as merchandise. (10) Users may feel appreciated for using a particular search engine website. Users may feel like they are actually being rewarded for their time spent on a search engine website, rather than wasting time and getting something for nothing. Instead of making the search engine website money, the users are benefiting as well by accumulating points to exchange for merchandise or other rewards/prizes. (11) By rewarding users to recommend (or not recommend) websites, users are encouraged to participate in the refinement of regular search results. This generates more User Recommended search results, which in turn help other users find the information they are looking for with greater accuracy. The more people who recommend (or don't recommend) websites, the better the User generated search result data will be. One way to encourage users to keep recommending websites to others is to incentivize users by the way of rewards. This motivates users to make some type of recommendation when they view a website.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of using user feedback to improve searching, comprising the steps of:
    providing a dictionary data structure that includes a plurality of terms and a plurality of classifications corresponding to the plurality of terms;
    receiving a query from a user;
    generating a subset of the plurality of terms by accessing the dictionary data structure using the query;
    generating a revised query based on one or more of the plurality of classifications corresponding to the subset of the plurality of terms;
    generating a first plurality of search results from a first search data structure using the revised query, wherein the first search data structure includes a first plurality of search data and a plurality of user feedback data associated with the first plurality of search data;
    generating a second plurality of search results from a second search data structure using the query, wherein the second search data structure includes a second plurality of search data;
    displaying the first plurality of search results according to the plurality of user feedback data that corresponds to the first plurality of search results;
    displaying the second plurality of search results;
    displaying a feedback request regarding a particular search result of the first plurality of search results and the second plurality of search results;
    receiving feedback from the user in response to the feedback request;
    updating the first plurality of search data and the plurality of user feedback data in the first search data structure according to the query, the particular search result, and the feedback.

2. The method of claim 1, further comprising:
    associating a reward with the user in response to receiving the feedback.

3. The method of claim 1, further comprising:
    receiving a plurality of feedback from the user in response to a plurality of feedback requests corresponding to a plurality of particular search results;
    storing, in a user profile data structure, the plurality of particular search results; and
    displaying for the user the plurality of particular search results from the user profile data structure.

4. The method of claim 1,
    wherein the plurality of classifications classify the plurality of terms as nouns, verbs and adjectives; and
    wherein the revised query is generated from the subset of the plurality of terms that are the nouns.

5. The method of claim 1,
    wherein the revised query is used instead of the query to generate the first plurality of search results and to update the first plurality of search data.

6. The method of claim 1, further comprising:
    setting a plurality of user personalization options; and
    displaying the first plurality of search results in accordance with the plurality of user personalization options.

7. The method of claim 1, further comprising:
    setting a user personalization option related to a favorable feedback; and
    displaying the first plurality of search results such that at least one of the first plurality of search results having the favorable feedback is displayed.

8. The method of claim 1, further comprising:
    setting a user personalization option related to a negative feedback; and
    displaying the first plurality of search results such that at least one of the first plurality of search results having the negative feedback is not displayed.

9. The method of claim 1, wherein the user comprises a first user, further comprising:
    setting a user personalization option that the feedback of the first user remains local to the first user; and
    displaying the first plurality of search results for a second user without the feedback from the first user.

10. The method of claim 1, further comprising:
    receiving a suggested search result from the user related to the query; and
    updating the first plurality of search data in the first search data structure according to the query and the suggested search result.

11. The method of claim 1, further comprising:
    receiving a tag from the user, wherein the tag is related to the particular search result;
    updating the first plurality of search data in the first search data structure according to the tag as well as the query.

12. The method of claim 1, wherein the feedback request is one of a plurality of feedback requests, wherein each of the first and second pluralities of search results are associated with a corresponding one of the plurality of feedback requests, and wherein the plurality of feedback requests are displayed with the first and second pluralities of search results.

13. The method of claim 1, wherein the particular search result indicates a particular webpage, further comprising:
    receiving a user input related to the particular search result; and
    displaying the particular webpage in response to the user input, wherein the feedback request is displayed with the particular webpage.

14. The method of claim 1, wherein the particular search result indicates a particular webpage, further comprising:
    receiving a user input related to the particular search result, wherein the user input corresponds to clicking the particular search result; and
    displaying the particular webpage in response to the user input, wherein the feedback request is displayed with the particular webpage.

15. The method of claim 1, wherein the step of displaying the feedback request further comprises:

displaying a plurality of feedback requests next to the first and second pluralities of search results, wherein the user provides the feedback regarding a particular search result without visiting a website corresponding to the particular search result.

16. The method of claim 1, further comprising:
executing, on a computer system associated with the user, a computer program that implements a toolbar with which the user provides the feedback.

17. The method of claim 1, wherein the particular search result indicates a particular webpage, further comprising:
receiving a user input related to the particular search result, wherein the user input corresponds to mousing over the particular search result; and
displaying the particular webpage in response to the user input, wherein the feedback request is displayed with the particular webpage.

18. The method of claim 1, wherein the particular search result indicates a particular webpage, further comprising:
receiving a user input related to the particular search result, wherein the user input corresponds to mousing over the particular search result;
displaying the particular webpage in response to the user input, wherein the feedback request is displayed with the particular webpage; and
stopping displaying the particular webpage when the user mouses out of the particular webpage.

19. The method of claim 1, wherein the particular search result indicates a particular webpage, and wherein the first and second pluralities of search results are displayed on a search results webpage, further comprising:
receiving a user input related to the particular search result, wherein the user input corresponds to mousing over the particular search result on the search results webpage;
displaying the particular webpage in a frame on top of the search results webpage in response to the user input, wherein the feedback request is displayed in the frame with the particular webpage.

20. The method of claim 1, wherein the particular search result indicates a particular webpage, and wherein the first and second pluralities of search results are displayed on a search results webpage, further comprising:
receiving a user input related to the particular search result, wherein the user input corresponds to mousing over the particular search result on the search results webpage;
displaying the particular webpage in a frame on top of the search results webpage in response to the user input, wherein the feedback request is displayed in the frame with the particular webpage; and
stopping displaying the frame when the user mouses out of the frame.

21. The method of claim 1, wherein the first search data structure comprises a first table, wherein the second search data structure comprises a second table, and wherein a database includes the first table and the second table.

22. The method of claim 1, wherein the first search data structure comprises a first plurality of tables, wherein the second search data structure comprises a second plurality of tables, and wherein a database includes the first plurality of tables and the second plurality of tables.

23. The method of claim 1, wherein a database comprises a table that includes the first search data structure and the second search data structure.

24. A computer-implemented method of using user feedback to improve searching, comprising the steps of:
providing a dictionary data structure that includes a plurality of terms and a plurality of classifications corresponding to the plurality of terms;
receiving a query from a user;
generating a subset of the plurality of terms by accessing the dictionary data structure using the query;
generating a revised query based on one or more of the plurality of classifications corresponding to the subset of the plurality of terms;
generating a first plurality of search results from a first search data structure using the query, wherein the first search data structure includes a first plurality of search data and a plurality of user feedback data associated with the first plurality of search data;
generating a second plurality of search results from a second search data structure using the query, wherein the second search data structure includes a second plurality of search data;
displaying the first plurality of search results according to the plurality of user feedback data that corresponds to the first plurality of search results;
displaying the second plurality of search results;
displaying a feedback request regarding a particular search result of the first plurality of search results and the second plurality of search results;
receiving feedback from the user in response to the feedback request; and
updating the first plurality of search data and the plurality of user feedback data in the first search data structure according to the query, the particular search result, and the feedback, wherein the revised query is used instead of the query to update the first plurality of search data.

25. The method of claim 24,
wherein the plurality of classifications classify the plurality of terms as nouns, verbs and adjectives; and
wherein the revised query is generated from the subset of the plurality of terms that are the nouns.

26. The method of claim 24, wherein the particular search result indicates a particular webpage, further comprising:
receiving a user input related to the particular search result, wherein the user input corresponds to mousing over the particular search result; and
displaying the particular webpage in response to the user input, wherein the feedback request is displayed with the particular webpage.

27. The method of claim 24, wherein the particular search result indicates a particular webpage, further comprising:
receiving a user input related to the particular search result, wherein the user input corresponds to mousing over the particular search result;
displaying the particular webpage in response to the user input, wherein the feedback request is displayed with the particular webpage; and
stopping displaying the particular webpage when the user mouses out of the particular webpage.

28. The method of claim 24, wherein the particular search result indicates a particular webpage, and wherein the first and second pluralities of search results are displayed on a search results webpage, further comprising:
receiving a user input related to the particular search result, wherein the user input corresponds to mousing over the particular search result on the search results webpage;
displaying the particular webpage in a frame on top of the search results webpage in response to the user input, wherein the feedback request is displayed in the frame with the particular webpage.

29. The method of claim 24, wherein the particular search result indicates a particular webpage, and wherein the first and second pluralities of search results are displayed on a search results webpage, further comprising:
- receiving a user input related to the particular search result, wherein the user input corresponds to mousing over the particular search result on the search results webpage;
- displaying the particular webpage in a frame on top of the search results webpage in response to the user input, wherein the feedback request is displayed in the frame with the particular webpage; and
- stopping displaying the frame when the user mouses out of the frame.

30. A computer-implemented method of using user feedback to improve searching, comprising the steps of:
- receiving a query from a user;
- generating a first plurality of search results from a first search data structure using the query, wherein the first search data structure includes a first plurality of search data and a plurality of user feedback data associated with the first plurality of search data;
- generating a second plurality of search results from a second search data structure using the query, wherein the second search data structure includes a second plurality of search data;
- displaying the first plurality of search results according to the plurality of user feedback data that corresponds to the first plurality of search results;
- displaying the second plurality of search results;
- receiving a user input related to a particular search result of the first plurality of search results and the second plurality of search results, wherein the user input corresponds to mousing over the particular search result;
- displaying a feedback request regarding the particular search result, wherein the particular search result indicates a particular webpage;
- displaying the particular webpage in response to the user input, wherein the feedback request is displayed with the particular webpage;
- receiving feedback from the user in response to the feedback request; and
- updating the first plurality of search data and the plurality of user feedback data in the first search data structure according to the query, the particular search result, and the feedback.

31. The method of claim 30, further comprising:
stopping displaying the particular webpage when the user mouses out of the particular webpage.

32. A computer-implemented method of using user feedback to improve searching, comprising:
- receiving a query from a user;
- generating a first plurality of search results from a first search data structure using the query, wherein the first search data structure includes a first plurality of search data and a plurality of user feedback data associated with the first plurality of search data;
- generating a second plurality of search results from a second search data structure using the query, wherein the second search data structure includes a second plurality of search data;
- displaying the first plurality of search results according to the plurality of user feedback data that corresponds to the first plurality of search results;
- displaying the second plurality of search results;
- receiving a user input related to a particular search result of the first plurality of search results and the second plurality of search results, wherein the particular search result indicates a particular webpage, wherein the first and second pluralities of search results are displayed on a search results webpage, and wherein the user input corresponds to mousing over the particular search result on the search results webpage;
- displaying a feedback request regarding the particular search result, wherein the particular search result indicates a particular webpage;
- displaying the particular webpage in a frame on top of the search results webpage in response to the user input, wherein the feedback request is displayed in the frame with the particular webpage;
- receiving feedback from the user in response to the feedback request; and
- updating the first plurality of search data and the plurality of user feedback data in the first search data structure according to the query, the particular search result, and the feedback.

33. The method of claim 32, further comprising:
stopping displaying the frame when the user mouses out of the frame.

34. A search engine system implemented on a computer system for using user feedback to improve searching, comprising:
- a first search data structure that includes a first plurality of search data and a plurality of user feedback data associated with the first plurality of search data;
- a second search data structure that includes a second plurality of search data; and
- a search engine, coupled to the first search data structure and the second search data structure, that executes processing comprising:
    - receiving a query from a user,
    - generating a first plurality of search results from the first search data structure using the query,
    - generating a second plurality of search results from the second search data structure using the query,
    - displaying the first plurality of search results according to the plurality of user feedback data that corresponds to the first plurality of search results,
    - displaying the second plurality of search results,
    - receiving a user input related to a particular search result of the first plurality of search results and the second plurality of search results, wherein the user input corresponds to mousing over the particular search result,
    - displaying a feedback request regarding the particular search result, wherein the particular search result indicates a particular webpage,
    - displaying the particular webpage in response to the user input, wherein the feedback request is displayed with the particular webpage,
    - receiving feedback from the user in response to the feedback request, and
    - updating the first plurality of search data and the plurality of user feedback data in the first search data structure according to the query, the particular search result, and the feedback.

35. The search engine system of claim 34, wherein the search engine executes processing further comprising:
stopping displaying the particular webpage in response to the user mousing out of the particular webpage.

36. The search engine system of claim 34, wherein the search engine executes processing further comprising:
associating a reward with the user in response to receiving the feedback.

37. The search engine system of claim 34, wherein the search engine executes processing further comprising:

receiving a plurality of feedback from the user in response to a plurality of feedback requests corresponding to a plurality of particular search results;
storing, in a user profile data structure, the plurality of particular search results; and
displaying for the user the plurality of particular search results from the user profile data structure.

38. The search engine system of claim 34, wherein the search engine executes processing further comprising:
providing a dictionary data structure that includes a plurality of terms and a plurality of classifications corresponding to the plurality of terms;
generating a subset of the plurality of terms by accessing the dictionary data structure using the query;
generating a revised query based on one or more of the plurality of classifications corresponding to the subset of the plurality of terms; and
using the revised query instead of the query to generate the first plurality of search results.

39. The search engine system of claim 34, wherein the search engine executes processing further comprising:
providing a dictionary data structure that includes a plurality of terms and a plurality of classifications corresponding to the plurality of terms;
generating a subset of the plurality of terms by accessing the dictionary data structure using the query;
generating a revised query based on one or more of the plurality of classifications corresponding to the subset of the plurality of terms; and
using the revised query instead of the query to update the first plurality of search data.

40. The search engine system of claim 34, wherein the search engine executes processing further comprising:
providing a dictionary data structure that includes a plurality of terms and a plurality of classifications corresponding to the plurality of terms;
generating a subset of the plurality of terms by accessing the dictionary data structure using the query;
generating a revised query based on one or more of the plurality of classifications corresponding to the subset of the plurality of terms; and
using the revised query instead of the query to generate the first plurality of search results and to update the first plurality of search data.

41. The search engine system of claim 34, wherein the search engine executes processing further comprising:
setting a user personalization option related to a favorable feedback; and
displaying the first plurality of search results such that at least one of the first plurality of search results having the favorable feedback is displayed.

42. The search engine system of claim 34, wherein the search engine executes processing further comprising:
setting a user personalization option related to a negative feedback; and
displaying the first plurality of search results such that at least one of the first plurality of search results having the negative feedback is not displayed.

43. A computer program tangibly embodied on a computer readable storage medium, the computer program when executed causing a computer system to implement processing comprising:
managing a first search data structure that includes a first plurality of search data and a plurality of user feedback data associated with the first plurality of search data;
managing a second search data structure that includes a second plurality of search data;
receiving a query from a user;
generating a first plurality of search results from the first search data structure using the query;
generating a second plurality of search results from the second search data structure using the query;
displaying the first plurality of search results according to the plurality of user feedback data that corresponds to the first plurality of search results;
displaying the second plurality of search results;
receiving a user input related to a particular search result of the first plurality of search results and the second plurality of search results, wherein the user input corresponds to mousing over the particular search result;
displaying a feedback request regarding the particular search result, wherein the particular search result indicates a particular webpage;
displaying the particular webpage in response to the user input, wherein the feedback request is displayed with the particular webpage;
receiving feedback from the user in response to the feedback request; and
updating the first plurality of search data and the plurality of user feedback data in the first search data structure according to the query, the particular search result, and the feedback.

44. The computer program of claim 43, wherein the computer system is configured to implement processing further comprising:
stopping displaying the particular webpage in response to the user mousing out of the particular webpage.

45. The computer program of claim 43, wherein the computer system is configured to implement processing further comprising:
associating a reward with the user in response to receiving the feedback.

46. The computer program of claim 43, wherein the computer system is configured to implement processing further comprising:
receiving a plurality of feedback from the user in response to a plurality of feedback requests corresponding to a plurality of particular search results;
storing, in a user profile data structure, the plurality of particular search results; and
displaying for the user the plurality of particular search results from the user profile data structure.

47. The computer program of claim 43, wherein the computer system is configured to implement processing further comprising:
providing a dictionary data structure that includes a plurality of terms and a plurality of classifications corresponding to the plurality of terms;
generating a subset of the plurality of terms by accessing the dictionary data structure using the query;
generating a revised query based on one or more of the plurality of classifications corresponding to the subset of the plurality of terms; and
using the revised query instead of the query to generate the first plurality of search results.

48. The computer program of claim 43, wherein the computer system is configured to implement processing further comprising:
providing a dictionary data structure that includes a plurality of terms and a plurality of classifications corresponding to the plurality of terms;
generating a subset of the plurality of terms by accessing the dictionary data structure using the query;

generating a revised query based on one or more of the plurality of classifications corresponding to the subset of the plurality of terms; and using the revised query instead of the query to update the first plurality of search data.

49. The computer program of claim 43, wherein the computer system is configured to implement processing further comprising:

providing a dictionary data structure that includes a plurality of terms and a plurality of classifications corresponding to the plurality of terms;

generating a subset of the plurality of terms by accessing the dictionary data structure using the query;

generating a revised query based on one or more of the plurality of classifications corresponding to the subset of the plurality of terms; and using the revised query instead of the query to generate the first plurality of search results and to update the first plurality of search data.

50. The computer program of claim 43, wherein the computer system is configured to implement processing further comprising:

setting a user personalization option related to a favorable feedback; and displaying the first plurality of search results such that at least one of the first plurality of search results having the favorable feedback is displayed.

51. The computer program of claim 43, wherein the computer system is configured to implement processing further comprising:

setting a user personalization option related to a negative feedback; and displaying the first plurality of search results such that at least one of the first plurality of search results having the negative feedback is not displayed.

52. A computer program tangibly embodied on a computer readable storage medium, the computer program when executed causing a computer system to implement processing comprising:

receiving a query from a user;

generating a first plurality of search results from a first search data structure using the query, wherein the first search data structure includes a first plurality of search data and a plurality of user feedback data associated with the first plurality of search data;

generating a second plurality of search results from a second search data structure using the query, wherein the second search data structure includes a second plurality of search data;

displaying the first plurality of search results according to the plurality of user feedback data that corresponds to the first plurality of search results;

displaying the second plurality of search results;

receiving a user input related to a particular search result of the first plurality of search results and the second plurality of search results, wherein the particular search result indicates a particular webpage, wherein the first and second pluralities of search results are displayed on a search results webpage, and wherein the user input corresponds to mousing over the particular search result on the search results webpage;

displaying a feedback request regarding the particular search result;

displaying the particular webpage in a frame on top of the search results webpage in response to the user input, wherein the feedback request is displayed in the frame with the particular webpage;

receiving feedback from the user in response to the feedback request; and updating the first plurality of search data and the plurality of user feedback data in the first search data structure according to the query, the particular search result, and the feedback.

53. The computer program of claim 52, wherein the computer system is configured to implement processing further comprising:

stopping displaying the frame when the user mouses out of the frame.

54. A search engine system implemented on a computer system for using user feedback to improve searching, comprising:

a first search data structure that includes a first plurality of search data and a plurality of user feedback data associated with the first plurality of search data;

a second search data structure that includes a second plurality of search data; and a search engine, coupled to the first search data structure and the second search data structure, that executes processing comprising:

receiving a query from a user, generating a first plurality of search results from the first search data structure using the query, generating a second plurality of search results from the second search data structure using the query, displaying the first plurality of search results according to the plurality of user feedback data that corresponds to the first plurality of search results, displaying the second plurality of search results, receiving a user input related to a particular search result of the first plurality of search results and the second plurality of search results, wherein the particular search result indicates a particular webpage, wherein the first and second pluralities of search results are displayed on a search results webpage, and wherein the user input corresponds to mousing over the particular search result on the search results webpage, displaying a feedback request regarding the particular search result, displaying the particular webpage in a frame on top of the search results webpage in response to the user input, wherein the feedback request is displayed in the frame with the particular webpage, receiving feedback from the user in response to the feedback request, and updating the first plurality of search data and the plurality of user feedback data in the first search data structure according to the query, the particular search result, and the feedback.

55. The search engine system of claim 54, wherein the search engine executes processing further comprising:

stopping displaying the frame when the user mouses out of the frame.

* * * * *